(12) United States Patent
Okada et al.

(10) Patent No.: US 9,593,249 B2
(45) Date of Patent: Mar. 14, 2017

(54) WHITE INK, INK SET, INK CARTRIDGE, INKJET RECORDING APPARATUS, INKJET RECORDING METHOD, AND RECORDING METHOD

(71) Applicants: Takashi Okada, Kanagawa (JP); Hisashi Habashi, Kanagawa (JP); Tomohiro Inoue, Kanagawa (JP)

(72) Inventors: Takashi Okada, Kanagawa (JP); Hisashi Habashi, Kanagawa (JP); Tomohiro Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/948,618

(22) Filed: Nov. 23, 2015

(65) Prior Publication Data

US 2016/0152845 A1 Jun. 2, 2016

(30) Foreign Application Priority Data

Nov. 28, 2014 (JP) .................................. 2014-241982
May 18, 2015 (JP) .................................. 2015-101222

(51) Int. Cl.

| | | |
|---|---|---|
| *B41J 2/175* | (2006.01) | |
| *C09D 11/32* | (2014.01) | |
| *C09D 11/106* | (2014.01) | |
| *C09D 11/322* | (2014.01) | |
| *C09D 11/40* | (2014.01) | |

(52) U.S. Cl.
CPC ............ *C09D 11/32* (2013.01); *C09D 11/106* (2013.01); *C09D 11/322* (2013.01); *C09D 11/40* (2013.01)

(58) Field of Classification Search
CPC .... B41M 5/0023; C09D 7/1291; C09D 11/32; C09D 11/106; C09D 11/322; C09D 11/40; C08L 33/062; Y10T 428/24901; B41J 2/2107; B41J 31/4078; D06P 1/44
See application file for complete search history.

(56) References Cited

U.S. PATENT DOCUMENTS

| | | |
|---|---|---|
| 2003/0176535 A1 | 9/2003 | Chung et al. |
| 2005/0012798 A1* | 1/2005 | Adachi .................... B41J 2/145 347/100 |
| 2005/0117009 A1 | 6/2005 | Kawaguchi et al. |

(Continued)

FOREIGN PATENT DOCUMENTS

| | | |
|---|---|---|
| JP | 2005-161583 | 6/2005 |
| JP | 4015043 | 9/2007 |

(Continued)

*Primary Examiner* — Juanita D Jackson
(74) *Attorney, Agent, or Firm* — Oblon, McClelland, Maier & Neustadt, L.L.P.

(57) ABSTRACT

Provided is a white ink, including water, a water-soluble organic solvent, and a colorant including hollow resin particles, wherein the water-soluble organic solvent includes at least one of a monohydric alcohol having a boiling point of 240° C. or lower and a diol having a boiling point of 240° C. or lower, having at least one hydroxyl group bonded to an alkane chain at a site other than terminals of the alkane chain, and having 4 to 6 carbon atoms, and a content of the at least one of the monohydric alcohol and the diol is equal to or greater than 75.0% by mass of a total amount of the water-soluble organic solvent.

20 Claims, 5 Drawing Sheets

(56) References Cited

U.S. PATENT DOCUMENTS

| | | | | |
|---|---|---|---|---|
| 2006/0061643 A1* | 3/2006 | Furukawa | ............ | B41J 2/2114 347/101 |
| 2009/0182098 A1 | 7/2009 | Sano et al. | | |
| 2010/0143593 A1 | 6/2010 | Sano | | |

FOREIGN PATENT DOCUMENTS

| | | |
|---|---|---|
| JP | 2008-248220 | 10/2008 |
| JP | 5459460 | 1/2014 |
| JP | 5515650 | 4/2014 |
| JP | 2015-174868 | 10/2015 |

\* cited by examiner

WHITE INK, INK SET, INK CARTRIDGE, INKJET RECORDING APPARATUS, INKJET RECORDING METHOD, AND RECORDING METHOD

BACKGROUND OF THE INVENTION

Field of the Invention

The present invention relates to a white ink, an ink set, an ink cartridge, an inkjet recording apparatus, an inkjet recording method, and a recording method.

Description of the Related Art

When expressing a white color over transparent recording media, or when coloring colored recording media with a color ink, it has been conventional to use a white ink including hollow resin particles having a low specific gravity and hard to settle to sufficiently hide the transparent color of the transparent recording media, or the color of the colored recording media to improve the coloring performance of the color ink.

However, there are problems that the hollow resin particles may soften or collapse upon application of heat, and that once the hollow resin particles collapse, a favorable degree of whiteness cannot be obtained.

Hence, as a white colorant for hiding the transparent color of the transparent recording media and the color of the colored recording media, there is proposed a heat-resistant non-coloring ink that includes hollow microspherical particles, and has a high heat-resisting property obtained by cross-linking shells of the hollow microspherical particles with each other by a polymer (see, e.g., Japanese Patent (JP-B) No. 4015043).

SUMMARY OF THE INVENTION

However, because the shells of the hollow microspherical particles are cross-linked with each other by a polymer, there is a problem that the heat-resistant non-coloring ink is less able to scatter light and has a lower degree of whiteness, which results in a lower degree of whiteness of images after dried.

An object of the present invention is to provide a white ink capable of suppressing reduction in a degree of whiteness of a white image formed over a recording medium even when the white image is heated and dried immediately after formed.

A white ink of the present invention as a solution for solving the problems described above includes water, a water-soluble organic solvent, and a colorant including hollow resin particles. The water-soluble organic solvent is at least one of a monohydric alcohol having a boiling point of 240° C. or lower and a diol having a boiling point of 240° C. or lower, having at least one hydroxyl group bonded to an alkane chain at a site other than terminals of the alkane chain, and having 4 to 6 carbon atoms. A content of the at least one of the monohydric alcohol and the diol is equal to or greater than 75.0% by mass of a total amount of the water-soluble organic solvent.

According to the present invention, it is possible to provide a white ink capable of suppressing reduction in a degree of whiteness of a white image formed over a recording medium even when the white image is heated and dried immediately after formed.

Figure 1:
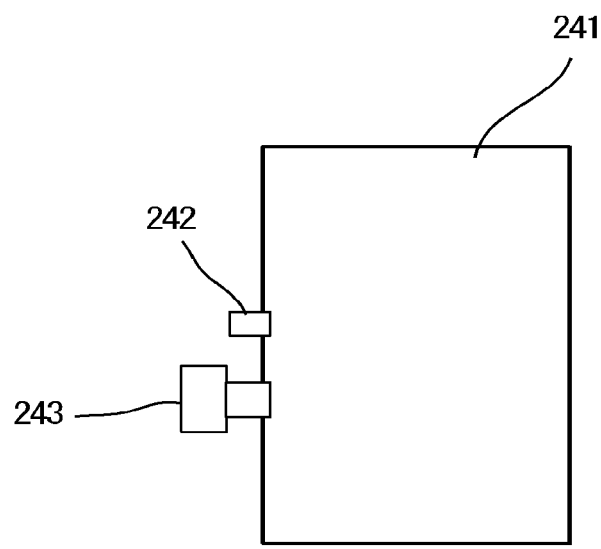
FIG. 1 is a schematic diagram illustrating an example of an ink cartridge of the present invention.

DETAILED DESCRIPTION OF THE INVENTION (White Ink)

A white ink of the present invention includes water, a water-soluble organic solvent, and a colorant, and further includes other components according to necessity.

<Water-Soluble Organic Solvent>

Examples of the water-soluble organic solvent include water-soluble organic solvents that have a boiling point of 240° C. or lower.

The boiling point of the water-soluble organic solvent having a boiling point of 240° C. or lower is 240° C. or lower, preferably 205° C. or lower, and more preferably from 70° C. to 205° C. When the boiling point is 240° C. or lower, the white ink has a good drying property and can form a coating film with a low energy. Further, the water-soluble organic solvent can easily dry, and hence tends not to remain in the hollow portions of hollow resin particles, which makes it likely for the hollow resin particles to be in a hollow state when in the coating film form.

Examples of the water-soluble organic solvent having a boiling point of 240° C. or lower include: a monohydric alcohol having a boiling point of 240° C. or lower; a diol having a boiling point of 240° C. or lower, having at least one hydroxyl group bonded to an alkane chain at a site other than terminals of the alkane chain, and having 4 to 6 carbon atoms; and preferably, other solvent components according to necessity. One of these may be used alone, or two or more of these may be used in combination. Among these, the diol having a boiling point of 240° C. or lower, having at least one hydroxyl group bonded to an alkane chain at a site other than terminals of the alkane chain, and having 4 to 6 carbon atoms is preferable.

Examples of the monohydric alcohol having a boiling point of 240° C. or lower include methanol (with a boiling point of 65° C.), ethanol (with a boiling point of 78° C.), 1-propanol (with a boiling point of 97° C.), 2-propanol (with a boiling point of 83° C.), 1-butanol (with a boiling point of 118° C.), 2-butanol (with a boiling point of 99° C.), tert-butanol (with a boiling point of 82° C.), 3-methoxy-1-butanol (with a boiling point of 158° C.), and tert-pentanol (with a boiling point of 102° C.). One of these may be used alone, or two or more of these may be used in combination. Among these, ethanol and 2-propanol are preferable in terms of a degree of whiteness of a recorded image.

A carbon number of the diol having a boiling point of 240° C. or lower, having at least one hydroxyl group bonded to an alkane chain at a site other than terminals of the alkane chain, and having 4 to 6 carbon atoms is from 4 to 6, and preferably from 4 to 5. When the carbon number is from 4 to 6, suppression of softening of the hollow resin particles, and a drying property of the white ink after image formation can be improved The diol having a boiling point of 240° C. or lower, having at least one hydroxyl group bonded to an alkane chain at a site other than terminals of the alkane chain, and having 4 to 6 carbon atoms is a diol, at least one of whose alcoholic hydroxyl groups is bonded to an alkane chain at a site other than terminals of the alkane chain. By the at least one hydroxyl group being bonded to an alkane chain at a site other than terminals of the alkane chain, a degree of whiteness of a white image can be improved.

Examples of the diol having a boiling point of 240° C. or lower, having at least one hydroxyl group bonded to an alkane chain at a site other than terminals of the alkane chain, and having 4 to 6 carbon atoms include 1,2-butanediol (with a boiling point of 194° C.), 1,3-butanediol (with a boiling point of 203° C.), 2,3-butanediol (with a boiling point of 183° C.), 1,2-propanediol (with a boiling pint of 188° C.), 3-methyl-1,3-butanediol (with a boiling pint of 203° C.), and 2-methyl-2,4-pentanediol (with a boiling pint of 197° C.). One of these may be used alone, or two or more of these may be used in combination. Among these, 1,2-butanediol, 1,3-butanediol, 2,3-butanediol, 3-methyl-1,3-butanediol, and 2-methyl-2,4-pentanediol are preferable, and 3-methyl-1,3-butanediol and 2-methyl-2,4-pentanediol are more preferable in terms of a degree of whiteness of a white image.

In terms of securing a jetting stability based on a moisture-retaining property, and adjusting a drying property of the white ink after image formation, miscibility with other components, fixability to a recording medium, etc., examples of the other solvent components include: multihydric alcohol compounds other than the diol having a boiling point of 240° C. or lower, having at least one hydroxyl group bonded to an alkane chain at a site other than terminals of the alkane chain, and having 4 to 6 carbon atoms; multihydric alcohol alkyl ether compounds; multihydric alcohol aryl ether compounds; cyclic ether compounds; nitrogen-containing heterocyclic compounds; amine compounds; amide compounds; sulfur-containing compounds; propylene carbonate; and ethylene carbonate. One of these may be used alone, or two or more of these may be used in combination.

Examples of the multihydric alcohol compounds other than the diol having a boiling point of 240° C. or lower, having at least one hydroxyl group bonded to an alkane chain at a site other than terminals of the alkane chain, and having 4 to 6 carbon atoms include ethylene glycol, polyethylene glycol, propylene glycol, dipropylene glycol, tripropylene glycol, polypropylene glycol, glycerin, 1,2,6-hexanetriol, trimethylol ethane, trimethylol propane, and propyl propylene glycol. One of these may be used alone, or two or more of these may be used in combination. Among these, glycerin is preferable in terms of a jetting stability based on a moisture-retaining property, and miscibility with other components.

Examples of the multihydric alcohol alkyl ether compounds include ethylene glycol monoethyl ether, ethylene glycol monobutyl ether, diethylene glycol monomethyl ether, diethylene glycol monoethyl ether, diethylene glycol monobutyl ether (with a boiling point of 231° C.), ethylene glycol mono-2-ethyl hexyl ether, propylene glycol monoethyl ether, and triethylene glycol dimethyl ether. One of these may be used alone, or two or more of these may be used in combination.

Examples of the multihydric alcohol aryl ether compounds include ethylene glycol monophenyl ether and ethylene glycol monobenzyl ether. One of these may be used alone, or two or more of these may be used in combination.

Examples of the cyclic ether compounds include epoxy compounds, oxetane compounds, tetrahydofuran compounds, tetrahydropyran compounds, and crown ethers. One of these may be used alone, or two or more of these may be used in combination. Among these, oxetane compounds and tetrahydrofuran compounds are preferable, and oxetane compounds are more preferable in terms of water-solubility.

Examples of the nitrogen-containing heterocyclic compounds include N-methyl-2-pyrrolidone (with a boiling point of 202° C.), N-hydroxyethyl-2-pyrrolidone, 2-pyrrolidone (with a boiling point of 245° C.), 1,3-dimethyl imidazolidinone, ∈-caprolactam, and γ-butyrolactone. One of these may be used alone, or two or more of these may be used in combination.

Examples of the amine compounds include monoethanol amine, diethanol amine, triethanol amine, N,N-dimethyl monoethanol amine, N-methyl diethanol amine, N-methyl ethanol amine, N-phenyl ethanol amine, and 3-aminopropyl diethylamine. One of these may be used alone, or two or more of these may be used in combination.

Examples of the amide compounds include formamide, N-methyl formamide, N,N-dimethyl formamide, β-methoxy-N,N-dimethyl propion amide, and β-butoxy-N, N-dimethyl propion amide. One of these may be used alone, or two or more of these may be used in combination.

Examples of the sulfur-containing compounds include dimethyl sulfoxide, sulfolane, and thio diglycol. One of these may be used alone, or two or more of these may be used in combination.

For measurement of the monohydric alcohol and the diol in the water-soluble organic solvent, it is possible to use, for example, a differential thermal balance-photoionization mass spectrometer simultaneous measuring system (product name: THERMO MASS PHOTO available from Rigaku Corporation) and a differential thermal balance-gas chromatography mass spectrometer simultaneous measuring instrument (product name: TG-DTA/GC-MS available from Rigaku Corporation).

A content of at least one of the monohydric alcohol and the diol is equal to or greater than 75.0% by mass, and preferably from 80% by mass to 95% by mass of the total amount of the water-soluble organic solvent. When the content is equal to or greater than 75% by mass, it is more likely for the hollow portions of the hollow resin particles to be hollow even when any water-soluble organic solvent that has a boiling point higher than 240° C. remains in the ink after the ink is heated and dried, making it possible for a white color to be expressed.

A content of a water-soluble organic solvent having a boiling point higher than 240° C. is equal to or less than 13% by mass, and preferably from 0% by mass to 10.0% by mass of the total amount of the water-soluble organic solvent. When the content is equal to or less than 13% by mass, it is more likely for the hollow portions of the hollow resin particles to be hollow even when the water-soluble organic solvent that has a boiling point higher than 240° C. remains in the ink after the ink is heated and dried, making it possible for a white color to be expressed.

A content of the other solvent components is preferably less than 25% by mass, more preferably equal to or greater than 0% by mass but less than 25% by mass, and particularly preferably from 0% by mass to 15% by mass of the total amount of the water-soluble organic solvent. When the content is less than 25% by mass, the hollow resin particles can maintain a degree of whiteness without structurally collapsing due to heating during drying.

<Colorant>

The colorant includes hollow resin particles, and further includes other coloring components according to necessity.

—Hollow Resin Particles—

The hollow resin particles are not particularly limited, and arbitrary hollow resin particles may be selected according to the purpose. Preferable hollow resin particles are hollow resin particles that include a resin as a shell and enclose a gas such as air.

Being hollow refers to a state of an article having an empty structure. Specifically, a hollow structure refers to a structure having at least any one of a space capable of enclosing a gas such as air and an opening through which a gas such as air can pass constantly. The hollow resin particles exhibit a white color and an excellent degree of opaqueness owing to light scattering attributed to a refractive index difference, after dried, between an air layer in the particles and a polymer layer as the shell.

The hollow resin particles are preferably hollow resin particles of which specific gravity is substantially equal to the specific gravity of the water-soluble organic solvent, because it is desirable that the hollow resin particles not precipitate or float and separate from the white ink. In the hollow resin particles, the portions that are hollow in a dry state are filled with a vehicle component mainly composed of water and the water-soluble organic solvent. Therefore, the specific gravity of the hollow resin particles can be seen to be substantially equal to the specific gravity of the vehicle component, and the hollow resin particles can be suppressed from settling out from the white ink. It is also possible to use solid resin particles that do not have a hollow structure, provided that it is necessary to adjust the specific gravity of the solid resin particles to the specific gravity of the vehicle component. This necessitates studies for the resin composition of the solid resin particles and comprehensive control over a polymerization (cross-linking) reaction and a particle diameter, thus raising the technical barrier. In the present invention, the content of at least one of the monohydric alcohol having a boiling point of 240° C. or lower and the diol having a boiling point of 240° C. or lower, having at least one hydroxyl group bonded to an alkane chain at a site other than terminals of the alkane chain, and having 4 to 6 carbon atoms is equal to or greater than 75.0% by mass of the total amount of the water-soluble organic solvent. Therefore, even though the hollow portions of the hollow resin particles are filled with the vehicle component, the hollow resin particles can be suppressed from being swelled by the vehicle component and softening, and can improve the degree of whiteness.

A volume average particle diameter (particle outer diameter) of the hollow resin particles is not particularly limited, and may be appropriately selected according to the purpose. However, the volume average particle diameter is preferably from 0.2 µm to 1 µm, more preferably from 0.3 µm to 0.8 µm, and particularly preferably from 0.3 µm to 0.5 µm. When the volume average particle diameter is from 0.2 µm to 1 µm, a degree of whiteness of a white image can be improved, and occurrence of clogging of an ink path in an inkjet recording apparatus and of an inkjet head can be suppressed. Examples of the method for measuring the volume average particle diameter include a method using a laser scattering/diffraction particle diameter measuring instrument.

A percentage of hollowness of the hollow resin particles is not particularly limited, and may be appropriately selected according to the purpose. However, the percentage of hollowness is preferably from 20% to 80%, and more preferably from 35% to 70%. When the percentage of hollowness is 20% or greater, a degree of whiteness of a printed image can be improved. When the percentage of hollowness is 80% or less, the hollow resin particles can have a small particle diameter, and can be suppressed from settling in the white ink.

Examples of the method for measuring the percentage of hollowness include a method using a scanning electron microscope (SEM). The percentage of hollowness refers to a cubic content ratio in the hollow resin particles when the hollow resin particles are approximated to a spherical shape, and is based on outer and inner diameters of the hollow resin particles (the inner diameter being the diameter of the hollow portions). The percentage of hollowness can be represented by the formula (1) below.

$$\text{Percentage of hollowness (\%)} = (\text{inner cubic content of hollow resin particles/cubic content of hollow resin particles}) \times 100 \quad (1)$$

$$\text{Inner cubic content of hollow resin particles} = 4\pi/3 \times (\text{inner diameter of hollow resin particles})^3$$

$$\text{Cubic content of hollow resin particles} = 4\pi/3 \times (\text{outer diameter of hollow resin particles})^3$$

Examples of a resin composition of the hollow resin particles include: acrylic-based resins such as an acrylic resin, a styrene-acrylic resin, and a cross-linked styrene-acrylic resin; urethane-based resins; and maleic-based resins One of these may be used alone, or two or more of these may be used in combination.

The hollow resin particles are not particularly limited, and may be an appropriately synthesized product or a commercially available product.

Examples of the commercially available product include: product name: ROPAQUE OP-62 (with an average particle diameter of 450 nm and a percentage of hollowness of 33%), product name: ROPAQUE OP-84J (with an average particle diameter of 550 nm and a percentage of hollowness of 20%), product name: ROPAQUE OP-91, product name: ROPAQUE HP-1055 (with an average particle diameter of 1,000 nm and a percentage of hollowness of 55%), product name: ROPAQUE HP-91 (with an average particle diameter of 1,000 nm and a percentage of hollowness of 50%), product name: ROPAQUE ULTRA (with an average particle diameter of 380 nm and a percentage of hollowness of 45%) (all available from Rohm and Haas Company), which are styrene-acrylic resins; product name: SX-863(A), product name: SX-864(B), product name: SX-866(A), product name: SX-866(B) (with an average particle diameter of 300 nm and a percentage of hollowness of 30%), and product name: SX-868 (with an average particle diameter of 500 nm) (all available from JSR Corporation), product name: ROPAQUE ULTRA E (with an average particle diameter of 380 nm and a percentage of hollowness of 45%) and product name: ROPAQUE ULTRA DUAL (with an average particle diameter of 380 nm and a percentage of hollowness of 45%) (both available from Rohm and Haas Company), which are cross-linked styrene-acrylic resins; and product name: NIPOL MH5055 (with an average particle diameter of 500 nm) and product name: NIPOL MH8101 (with an average particle diameter of 1 µm) (both available from Zeon Corporation), which are modified styrene-acrylic resins. One of these may be used alone, or two or more of these may be used in combination.

A glass transition temperature of the hollow resin particles can be measured by drying the hollow resin particles for 30 minutes by raising the temperature from normal temperature to 200° C. under a nitrogen atmosphere, cooling the resulting hollow resin particles, and then raising the temperature from normal temperature to 200° C. at a rate of 5° C./min with a differential scanning calorimeter (DSC).

A content of the hollow resin particles is preferably from 1% by mass to 20% by mass, and more preferably from 5% by mass to 15% by mass of the total amount of the white ink. When the content is from 1% by mass to 20% by mass, a degree of whiteness of a white image can be improved.

—Other Coloring Components—

Although the white ink is mainly white, it is possible to tone the color of the white ink by adding the other coloring components.

Colors of the other coloring components are not particularly limited, and arbitrary colors may be selected according to the purpose. Examples of the colors include a black color, colors, and a white color. One of these may be used alone, or two or more of these may be used in combination. Among these, colors that are more able to increase the degree of whiteness are preferable, because it is necessary to develop a sufficient whiteness with a thin coating film formed of a small amount of the white ink as it is difficult to form a thick coating film by inkjet recording.

Examples of the materials of the other coloring components include pigments and dyes. One of these may be used alone, or two or more of these may be used in combination. Among these, pigments are preferable in terms of weatherability. In a combined use of the pigments and the dyes for color tone adjustment, it is preferable to use the dyes within a range in which weatherability is not degraded.

——Pigments——

Examples of the pigments include inorganic pigments and organic pigments. One of these may be used alone, or two or more of these may be used in combination.

Examples of a method for dispersing the pigments include a dispersing method using a pigment to which self-dispersibility is imparted (a self-dispersible pigment); a method using a pigment dispersion in which a pigment is dispersed with a pigment dispersant, a polymeric dispersion stabilizer, etc.

Examples of the self-dispersible pigment include a pigment surface-treated such that at least one hydrophilic group is bonded to the surface of the pigment directly or via another atom group.

Examples of a method for producing the self-dispersible pigment include a method for chemically bonding a specific functional group (a functional group such as a sulfone group, and a carboxyl group) to the surface of the pigment; and a method for applying a wet oxidation treatment to the pigment with a hypohalous acid, a hypohalite, etc.

The white ink including the self-dispersible pigment is excellent in redispersibility after drying. Therefore, even after the printing operation has been suspended for a long term and a moisture content of the white ink has evaporated at the nozzles of the inkjet head, the nozzles has not been clogged with the white ink, and a favorable recording operation can be performed easily with only a simple cleaning operation.

When the self-dispersible pigment is combined with a surfactant and a permeation agent described below, the self-dispersible pigment has a particularly high synergy and can provide a more reliable high-quality image.

The self-dispersible pigment may also be used in the form of a polymer emulsion obtained by suspending the self-dispersible pigment in polymer particles. The polymer emulsion refers to a product obtained by encapsulating the pigment in the polymer particles, or a product obtained by adsorbing the pigment to the surface of the polymer particles.

It is not indispensable that the polymer emulsion encapsulate or adsorb all of the pigment particles, but it is also possible that the self-dispersible pigment be dispersed in the emulsion.

Examples of the polymer for forming the polymer emulsion include vinyl polymers, polyester polymers, and polyurethane polymers. One of these may be used alone, or two or more of these may be used in combination. Among these, vinyl polymers and polyester polymers are preferable, and the polymers disclosed in Japanese Patent Application Laid-Open (JP-A) Nos. 2000-53897 and 2001-139849.

An HLB value of the pigment dispersant is preferably from 10 to 20.

Examples of the pigment dispersant include nonionic surfactants.

Examples of the nonionic surfactants include polyoxyethylene alkyl ethers, polyoxyalkylene alkyl ethers, polyoxyethylene polycyclic phenyl ethers, sorbitan fatty acid esters, polyoxyethylene sorbitan fatty acid esters, polyoxyethylene alkyl phenyl ethers, polyoxyethylene alkyl amines, polyoxyethylene alkyl amides, and acetylene glycol. One of these may be used alone, or two or more of these may be used in combination. Among these, polyoxyethylene lauryl ether, polyoxyethylene-β-naphthyl ether, polyoxyethylene sorbitan monooleate, and polyoxyethylene styrene phenyl ether are preferable.

Examples of the polymeric dispersion stabilizer include α-olefin-maleic anhydride copolymers, styrene-(meth) acrylic copolymers, water-soluble polyurethane resins, and water-soluble polyester resins.

——Inorganic Pigments——

Examples of the inorganic pigments include titanium dioxide, copper oxide, iron oxide (C.I. Pigment Black 11), calcium carbonate, barium sulfate, aluminium hydroxide, barium yellow, cadmium red, chrome yellow, titanium yellow, and carbon black. One of these may be used alone, or two or more of these may be used in combination. Among these, titanium dioxide and carbon black are preferable, and titanium dioxide are preferable because titanium dioxide can adjust a settling property.

Examples of crystal forms of the titanium dioxide include a tetragonal rutile form, a tetragonal anatase form, and an orthorhombic brookite form. Among these, the rutile form is preferable because the rutile form has a high refractive index and is more able to increase the degree of whiteness.

A number average primary particle diameter of the titanium dioxide is preferably from 100 nm to 400 nm, and more preferably from 200 nm to 300 nm. When the number average primary particle diameter is from 100 nm to 400 nm, the titanium dioxide has a high degree of whiteness, and can increase a visible light scattering property. Note that the titanium dioxide has a high specific gravity and tends to settle out. Hence, it is preferable to select the number average primary particle diameter by considering the settling property and the degree of whiteness.

A method for producing the titanium dioxide is not particularly limited, and an arbitrary method may be selected according to the purpose. Examples include a sulfuric acid method and a chlorine method.

A surface treatment of the particles of the titanium dioxide is not particularly limited, and an arbitrary surface treatment may be selected according to the purpose. Examples include resin coating and alumina coating. Of these, alumina coating is preferable in terms of suppressing a catalytic activity of the titanium dioxide.

The titanium dioxide is not particularly limited, and may be an appropriately synthesized product or a commercially available product. Examples of the commercially available product include products available from Ishihara Sangyo Kaisha, Ltd., Sakai Chemical Industry Co., Ltd., Tayca Corporation, Titan Kogyo, Ltd., Fuji Titanium Industry Co., Ltd., Furukawa Chemicals Co., Ltd., Du Pont Kabushiki Kaisha, Tronox Limited, Kronos, Inc., and Millennium Inorganic Chemicals, Incorporated.

Examples of the carbon black include carbon blacks (C.I. Pigment Black 7) such as furnace black, lamp black, acetylene black, and channel black. One of these may be used alone, or two or more of these may be used in combination.

Examples of a method for producing the carbon black include known methods such as a contact method, a furnace method, and a thermal method.

The carbon black is not particularly limited, and may be an appropriately synthesized product or a commercially available product. Examples of the commercially available product include product name: REGAL (Registered Trademark), product name: BLACK PEARLS (Registered Trademark), product name: ELFTEX (Registered Trademark), product name: MONARCH (Registered Trademark), product name: MOGUL (Registered Trademark), and product name: VULCAN (Registered Trademark) (all available from Cabot Corporation).

———Organic Pigments———

Examples of the organic pigments include alkylene bismelamine-based pigments, azo pigments, polycyclic pigments, lake pigments, nitro pigments, nitroso pigments, and aniline black. One of these may be used alone, or two or more of these may be used in combination. Among these, azo pigments and polycyclic pigments are preferable.

Examples of the alkylene bismelamine-based pigments include compounds represented by the following general formula (I). These compounds are organic white pigments.

General Formula (I)

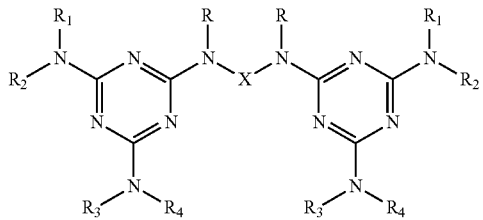

(In the general formula (I), R represents a hydrogen atom, an alkyl group having 1 to 4 carbon atoms, or a saturated or unsaturated alicyclic group having 5 to 7 carbon atoms. $R_1$ to $R_4$ represent a hydrogen atom or a lower alkyl group having 1 to 4 carbon atoms, and $R_1$ to $R_4$ may be the same as or different form one another. $R_1$ and $R_2$ or $R_3$ and $R_4$ may form a heterocyclic group together with a nitrogen atom. X represents an alkylene group having 2 to 3 carbon atoms.)

In the general formula (1), examples of the R include a hydrogen atom, an alkyl group having 1 to 4 carbon atoms, and a saturated or unsaturated alicyclic group having 5 to 7 carbon atoms.

Examples of the alkyl group include a methyl group, an ethyl group, a propyl group, and a butyl group.

Examples of the alicyclic group include a cyclohexyl group.

Examples of the $R_1$, the $R_2$, the $R_3$, and the $R_4$ include a hydrogen atom, a methyl group, an ethyl group, a propyl group, and a butyl group. The $R_1$ and the $R_2$ or the $R_3$ and the $R_4$ may form a heterocyclic group together with a nitrogen group.

Examples of the heterocyclic group include a piperidyl group and a morpholino group.

Examples of the X include an ethylene group and a propylene group.

Among the compounds represented by the general formula (I) above, a compound represented by the following general formula (II) in which the R, the $R_1$, the $R_2$, the $R_3$, and the $R_4$ are hydrogen atoms and X is an ethylene group is preferable. The compounds represented by the general formula (I) are not particularly limited, and may be commercially available products. Examples of the commercially available products include product name: SHIGENOX OWP (available from Hakkol Chemical Co., Ltd.).

General Formula (II)

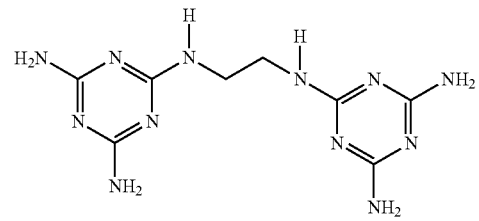

A volume average particle diameter of the alkylene bismelamine-based pigments is preferably from 0.01 µm to 0.3 µm. When the volume average particle diameter is 0.01 µm or greater, the alkylene bismelamine-based compounds do not have a particle diameter close to the particle diameter of dyes, and are not poor in light resistance and feathering resistance. When the volume average particle diameter is 0.3 µm or less, the alkylene bismelamine-based pigments will not clog a jetting port or a filter in a printer and will have jetting stability.

Examples of the azo pigments include azo lake pigments, sparingly-soluble azo pigments, condensed azo pigments, and chelate azo pigments. One of these may be used alone, or two or more of these may be used in combination.

Examples of the polycyclic pigments include phthalocyanine pigments, perylene pigments, perinone pigments, anthraquinone pigments, quinacridone pigments, dioxazine pigments, indigo pigments, thioindigo pigments, isoindolinone pigments, and quinoflarone pigments. One of these may be used alone, or two or more of these may be used in combination.

Examples of the organic pigments include: C.I. Pigment Black 1 (aniline black); C.I. Pigment Yellow 1, 3, 12, 13, 14, 17, 24, 34, 35, 37, 42 (yellow iron oxide), 53, 55, 74, 81, 83, 95, 97, 98, 100, 101, 104, 109, 110, 117, 120, 128, 138, 150, 151, 153, 155, 183, 213, and 408; C.I. Pigment Orange 5, 13, 16, 17, 36, 43, and 51; C.I. Pigment Red 1, 2, 3, 5, 17, 22, 23, 31, 38, 48:2, 48:2 (permanent red 2B (Ca)), 48:3, 48:4, 49:1, 52:2, 53:1, 57:1 (brilliant carmine 6B), 60:1, 63:1, 63:2, 64:1, 81, 83, 88, 101 (colcothar), 104, 105, 106, 108 (cadmium red), 112, 114, 122 (quinacridone magenta), 123, 146, 149, 166, 168, 170, 172, 177, 178, 179, 185, 190, 193, 209, and 219; C.I. Pigment Violet 1 (rhodamine lake), 3, 5:1, 16, 19, 23, and 38; C.I. Pigment blue 1, 2, 15 (phthalocyanine blue), 15:1, 15:2, 15:3 (phthalocyanine blue), 15:4 (phthalocyanine blue), 16, 17:1, 56, 60, and 63; and C.I. Pigment Green 1, 4, 7, 8, 10, 17, 18, and 36. One of these may be used alone, or two or more of these may be used in combination.

——Dyes——

Examples of the dyes include acid dyes, food colors, direct dyes, basic dyes, reactive dyes, disperse dyes, and dye chelates. One of these may be used alone, or two or more of these may be used in combination. Among these, acid dyes, food colors, and direct dyes are preferable, and acid dyes and direct dyes are more preferable in terms of solubility to water and a color developing property.

Examples of the acid dyes and the food colors include;

C.I. Acid Yellow 17, 23, 42, 44, 79, and 142;

C.I. Acid Red 1, 8, 13, 14, 18, 26, 27, 35, 37, 42, 52, 82, 87, 89, 92, 97, 106, 111, 114, 115, 134, 186, 249, 254, and 289;

C.I. Acid Blue 9, 29, 45, 92, and 249;

C.I. Acid Black 1, 2, 7, 24, 26, and 94;

C.I. Food Yellow 2, 3, and 4;

C.I. Food Red 7, 9, and 14; and

C.I. Food Black 1 and 2.

One of these may be used alone, or two or more of these may be used in combination.

Examples of the direct dyes include;

C.I. Direct Yellow 1, 12, 24, 26, 33, 44, 50, 120, 132, 142, 144, and 86;

C.I. Direct Red 1, 4, 9, 13, 17, 20, 28, 31, 39, 80, 81, 83, 89, 225, and 227;

C.I. Direct Orange 26, 29, 62, and 102;

C.I. Direct Blue 1, 2, 6, 15, 22, 25, 71, 76, 79, 86, 87, 90, 98, 163, 165, 199, and 202; and C.I. Direct Black 19, 22, 32, 38, 51, 56, 71, 74, 75, 77, 154, 168, and 171.

One of these may be used alone, or two or more of these may be used in combination.

Examples of the basic dyes include:

C.I. Basic Yellow 1, 2, 11, 13, 14, 15, 19, 21, 23, 24, 25, 28, 29, 32, 36, 40, 41, 45, 49, 51, 53, 63, 465, 67, 70, 73, 77, 87, and 91;

C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112;

C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155; and C.I. Basic Black 2 and 8.

One of these may be used alone, or two or more of these may be used in combination.

Examples of the reactive dyes include:

C.I. Reactive Black 3, 4, 7, 11, 12, and 17;

C.I. Reactive Yellow 1, 5, 11, 13, 14, 20, 21, 22, 25, 40, 47, 51, 55, 65, and 67;

C.I. Reactive Red 1, 14, 17, 25, 26, 32, 37, 44, 46, 55, 60, 66, 74, 79, 96, and 97; and C.I. Reactive Blue 1, 2, 7, 14, 15, 23, 32, 35, 38, 41, 63, 80, and 95.

One of these may be used alone, or two or more of these may be used in combination.

Examples of the disperse dyes include:

C.I. Disperse Yellow 3, 5, 7, 33, 42, 54, 64, 79, 82, 83, 93, 99, 100, 119, 122, 124, 126, 160, 199, 204, and 237;

C.I. Disperse Orange 3, 13, 29, 30, 54, 55, 66, 73, and 118;

C.I. Disperse Red 1, 17, 50, 54, 56, 60, 65, 72, 73, 88, 91, 92, 93, 110, 126, 127, 135, 143, 145, 153, 154, 156, 167, 177, 207, 258, 283, 311, 323, and 348;

C.I. Disperse Violet 1, 4, 26, 28, 35, 38, 43, and 77;

C.I. Disperse Blue 3, 7, 56, 60, 73, 79, 81, 91, 94, 96, 102, 106, 128, 139, 146, 148, 149, 165, 183, 186, 187, 197, 201, 205, 207, 214, 257, 266, 268, 291, 341, 354, and 358;

C.I. Disperse Brown 1; and

C.I. Disperse Black 1.

One of these may be used alone, or two or more of these may be used in combination.

Examples of the dye chelates include basic dye chelates and acid dye chelates. One of these may be used alone, or two or more of these may be used in combination.

A volume average particle diameter ($D_{50}$) of the colorant is preferably from 300 nm to 1 μm, and more preferably from 300 nm to 500 nm. When the volume average particle diameter is from 300 nm to 1 μm, jetting stability and accuracy of dot landing positions can be improved. The volume average particle diameter can be measured with, for example, a granularity distribution measuring instrument (product name: MICROTRAC UPA available from Nikkiso Co., Ltd.).

A content of the colorant is preferably from 1% by mass to 20% by mass, and more preferably from 5% by mass to 15% by mass of the total amount of the white ink in terms of a degree of whiteness of a white image. When the content is 1% by mass or greater, a degree of whiteness of a white image will be favorable, and the white ink can develop a color without being defeated by the color of the recording medium. When the content is 20% by mass or less, the white ink can be suppressed from thickening and improved in jettability, and there is an economical advantage as well.

Examples of the other coloring components include those described in "The Color Index", the third edition (The Society of Dyers and Colourists, 1982).

<Water>

The water is not particularly limited, and arbitrary water may be selected according to the purpose. Examples of the water include: pure water such as ion-exchanged water, ultrafiltrated water, reverse osmotic water, and distilled water; and ultrapure water. One of these may be used alone, or two or more of these may be used in combination.

<Other Components>

The white ink of the present invention can include other components used in common inks, in addition to the water, the water-soluble organic solvent, and the colorant.

The other components are not particularly limited, and arbitrary components may be selected according to the purpose. Examples include surfactants, film forming resins, antiseptics/mildewcides, anti-rust agents, and pH adjusters. One of these may be used alone, and two or more of these may be used in combination.

—Surfactants—

Examples of the surfactants include anionic surfactants, nonionic surfactants intended for any other purposes than dispersion of the pigments, amphoteric surfactants, acetylene glycol-based surfactants, fluorosurfactants, and silicone-based surfactants. One of these may be used alone, or two or more of these may be used in combination. These surfactants may not be easily dissolved in the white ink if added alone. However, when two or more of these surfactants are used in combination, there may be cases where the surfactants are solubilized and can exist stably in the white ink. Further, it is preferable to select a surfactant that does not spoil dispersion stability depending on the kind of the colorant and combination with a moistening agent and the water-soluble organic solvent.

Examples of the anionic surfactants include polyoxyethylene alkyl ether acetates, dodecyl benzene sulfonates, succinate ester sulfonates, laurates, and polyoxyethylene alkyl ether sulfates. One of these may be used alone, or two or more of these may be used in combination.

Examples of the nonionic surfactants include polyoxyethylene alkyl ethers, polyoxyethylene polyoxypropylene alkyl ethers, polyoxyethylene alkyl esters, polyoxyethylene polyoxypropylene alkyl esters, polyoxyethylene sorbitan fatty acid esters, polyoxyethylene alkyl phenyl ethers, polyoxyethylene alkyl amines, and polyoxyethylene alkyl amides. One of these may be used alone, or two or more of these may be used in combination.

Examples of the amphoteric surfactants include alkyl dimethyl amine oxides, dihydroxy ethyl alkyl amine oxides, polyoxyethylene alkyl dimethyl amine oxides, lauryl amino propionates, dimethyl alkyl (palm) betaines, lauryl dimethyl betaines, stearyl dimethyl betaines, and lauryl dihydroxy ethyl betaines. One of these may be used alone, or two or more of these may be used in combination. Specific examples of these include lauryl dimethyl amine oxide, myristyl dimethyl amine oxide, stearyl dimethyl amine oxide, dihydroxy ethyl lauryl amine oxide, polyoxyethylene palm oil alkyl dimethyl amine oxide, dimethyl alkyl (palm) betaine, and lauryl dimethyl betaine. One of these may be used alone, or two or more of these may be used in combination.

Examples of the acetylene glycol-based surfactants include 2,4,7,9-tetramethyl-5-desine-4,7-diol, 3,6-dimethyl-4-octine-3,6-diol, and 3,5-dimethyl-1-hexin-3-ol. One of these may be used alone, or two or more of these may be used in combination.

The acetylene glycol-based surfactants are not particularly limited, and may be commercially available products. Examples of the commercially available products include product name: SURFYNOL 104, 82, 465, 485, and TG (all available from Air Products and Chemicals, Inc.). One of these may be used alone, or two or more of these may be used in combination.

Examples of the fluorosurfactants include perfluoroalkyl sulfonates, perfluoroalkyl carboxylates, perfluoroalkyl phosphate esters, perfluoroalkyl ethylene oxide adducts, perfluoroalkyl betaines, perfluoroalkyl amine oxide compounds, polyoxyalkylene ether polymers having a perfluoroalkyl ether group on a side chain and sulfate ester salts of the polyoxyalkylene ether polymers having a perfluoroalkyl ether group on a side chain, and fluorine-based fatty acid-based polymer esters. One of these may be used alone, or two or more of these may be used in combination.

The fluorosurfactants are not particularly limited, and may be commercially available products. Examples of the commercially available products include: product name: SURFLON S-111, S-112, S-113, S121, S131, S132, S-141, and S-145 (all available from Asahi Glass Co., Ltd.); product name: FLUORAD FC-93, FC-95, FC-98, FC-129, FC-135, FC-170C, FC-430, FC-431, and FC-4430 (all available from 3M Japan Limited); product name: FT-110, 250, 251, and 400S (all available from Neos Co., Ltd.); product name: ZONYL FS-62, FSA, FSE, FSJ, FSP, TBS, UR, FSO, FSO-100, FSN N, FSN-100, FS-300, and FSK (all available from Du Pont Kabushiki Kaisha); and POLYFOX PF-136A, PF-156A, and PF-151N (all available from Omnova Solutions Inc.). One of these may be used alone, or two or more of these may be used in combination.

The silicone-based surfactants are not particularly limited, and arbitrary silicone-based surfactants may be selected according to the purpose. Silicone-based surfactants that do not decompose even at a high pH are preferable, and examples of such silicone-based surfactants include side chain-modified polydimethyl siloxanes, both terminal-modified polydimethyl siloxanes, one terminal-modified polydimethyl siloxanes, and side chain/both terminal-modified polydimethyl siloxanes. One of these may be used alone, or two or more of these may be used in combination. Among these, polyether-modified silicone-based surfactants having a polyoxyethylene group and a polyoxyethylene polyoxypropylene group are preferable because such polyether-modified silicone-based surfactants express favorable properties as aqueous surfactants.

The polyether-modified silicone-based surfactants are not particularly limited, and arbitrary polyether-modified silicone-based surfactants may be selected according to the purpose. Examples include compounds obtained by incorporating a polyalkylene oxide structure to a side chain of a Si moiety of dimethyl polysiloxane.

The polyether-modified silicone-based surfactants are not particularly limited, and may be commercially available products. Examples of the commercially available products include product name: KF-618, KF-642, and KF-643 (all available from Shin-Etsu Chemical Co., Ltd.). One of these may be used alone, or two or more of these may be used in combination.

A content of the surfactants relative to the total amount of the white ink is preferably from 0.01% by mass to 5% by mass in terms of expression of a permeating effect, and more preferably from 0.5% by mass to 2% by mass in terms of adaptability to many commercially available media. When the content is 0.01% by mass or greater, the permeating effect can be improved. When the content is 5% by mass or less, excess wettability to a recording medium can be suppressed, and problems such as degradation of jetting stability and occurrence of beading can be prevented.

—Film Forming Resins—

The film forming resins are excellent in a film forming property (an image forming property), has a high water-repellent property, a high water resistance, and a high weatherability, and are added in order to improve a high image density (a high color developing property).

A volume average particle diameter of the film forming resins is preferably from 10 nm to 1,000 nm, more preferably from 10 nm to 200 nm, and particularly preferably from 10 nm to 50 nm. When the volume average particle diameter is from 10 nm to 1,000 nm, the film forming resins can be used in an inkjet recording apparatus with no difficulty. When the volume average particle diameter is from 10 nm to 50 nm, the film forming property of the film forming resins is improved, and a strong continuous coating film of the film forming resins will be formed, thus making it possible to obtain a printed matter having a high strength. The volume average particle diameter of the film forming resins can be measured with, for example, a granularity analyzer (product name: MICROTRAC MODEL UPA9340 available from Nikkiso Co., Ltd.).

Examples of the film forming resins include condensation-type synthetic resins, addition-type synthetic resins, and natural polymeric compounds. One of these may be used alone, or two or more of these may be used in combination. Among these, condensation-type synthetic resins are preferable.

Examples of the condensation-type synthetic resins include polyester resins, polyurethane resins, polyepoxy resins, polyamide resins, polyether resins, poly(meth)acrylic resins, acrylic-silicone resins, and fluorine-based resins One of these may be used alone, or two or more of these may be used in combination. Among these, polyurethane resins, acrylic-silicone resins, and fluorine-based resins are preferable.

Examples of the addition-type synthetic resins include polyolefin resins, polystyrene-based resins, polyvinyl alcohol-based resins, polyvinyl ester-based resins, polyacrylic acid-based resins, and unsaturated carboxylic acid-based resins One of these may be used alone, or two or more of these may be used in combination.

Examples of the natural polymeric compounds include cellulose compounds, rosin compounds, and natural rubbers. One of these may be used alone, or two or more of these may be used in combination.

The film forming resins may be used in the form of a homopolymer, or may be used in the form of a composite resin such as a copolymer. Any of the following types of the film forming resins may be used: a single-phase structure type, a core-shell type, and a power feed emulsion.

The film forming resins may be appropriately synthesized products or commercially available products. Examples of the commercially available products include product name: MICROGEL E-1002 and E-5002 (component name: styrene-acrylic-based resin particles, both available from Nippon Paint Co., Ltd.), product name: BONKOTE 4001 (component name: acrylic-based resin particles, available from DIC Corporation), product name: BONKOTE 5454 (component name: styrene-acrylic-based resin particles, available from DIC Corporation), product name: SAE-1014 (styrene-acrylic-based resin particles, available from Zeon Corporation), product name: SAIVINOL SK-200 (acrylic-based resin particles, available from Saiden Chemical Industry Co., Ltd.), product name: PRIMAL AC-22 and AC-61 (acrylic-based resin particles, available from Rohm and Haas Company), product name: NANOCRYL SBCX-2821 and 3689 (acrylic silicone-based resins, available from Toyo Ink Co., Ltd.), and product name: #3070 (methyl methacrylate polymer resin particles, available from Mikuni Color Ltd.). One of these may be used alone, or two or more of these may be used in combination. Among these, acrylic-based resins and urethane resins are preferable in terms of fixability and ink stability.

When the white ink is used for outdoor applications such as posters and signboards, the film forming resins are required to be able to form a coating film excellent in a long-term weatherability. Therefore, polyurethane resin particles are preferable in terms of coating film strength, and polycarbonate-based urethane resins are more preferable in terms of water resistance, heat resistance, wear resistance, and weatherability.

The polyurethane resins particles can be synthesized by reacting an isocyanate compound with a diol.

As the isocyanate compound, an aliphatic diisocyanate and an alicyclic diisocyanate are preferable in terms of improving weatherability, and an alicyclic diisocyanate is more preferable.

Examples of the alicyclic diisocyanate include isophorone diisocyanate and dicyclohexyl methane diisocyanate.

A content of the alicyclic diisocyanate is preferably equal to or greater than 60% by mass of the total isocyanate compound amount.

The polycarbonate-based urethane resin particles may be added in the form of a resin emulsion dispersed in an aqueous medium.

A resin solid content of the resin emulsion is preferably 20% by mass or greater. When the resin solid content is 20% by mass or greater, there is no problem in formulation designing for compounding the resin emulsion as the white ink.

A volume average particle diameter of the urethane resin particles is preferably from 10 nm to 350 nm in terms of liquid storage stability and jetting stability when the urethane resin particles are compounded as the white ink. The volume average particle diameter can be measured with, for example, a granularity distribution measuring instrument (product name: MICROTRAC UPA available from Nikkiso Co., Ltd.).

The urethane resin particles may be in the form of a forcibly emulsified resin emulsion dispersed in an aqueous medium with a dispersant. However, there may be a case where the dispersant remains in the coating film and reduces the strength of the coating film. Hence, the resin emulsion is preferably a self-emulsified type produced from the urethane resin particles having an anionic group in the molecular structure.

An acid value of the self-emulsifiable resin is preferably from 5 mgKOH/g to 100 mgKOH/g, more preferably from 20 mgKOH/g to 100 mgKOH/g, and particularly preferably from 20 mgKOH/g to 50 mgKOH/g in terms of water dispersibility. When the acid value is from 5 mgKOH/g to 100 mgKOH/g, scratch resistance and chemical resistance can be obtained. The acid value of the resin can be measured according to JIS K-0070. Further, it is preferable that the film forming resins be modified with an anionic group in terms of water dispersibility.

Examples of the anionic group include a carboxyl group and a sulfonic acid group. Examples of a method for modifying the film forming resins with the anionic group include a method for reacting the film forming resins with a monomer having the anionic group.

Examples of a method for producing the urethane resin particles is not particularly limited, and the urethane resin particles may be produced according to a conventionally-known producing method.

Owing to the high heat resistance of the polycarbonate-based urethane resin particles, addition of the polycarbonate-based urethane resin particles as the film forming resins enables heating and drying after recording, which can reduce a residual solvent and improve adhesiveness.

A lowest film forming temperature of the polycarbonate-based urethane resin particles needs not be equal to or lower than room temperature, but is preferably equal to or lower than at least a heating temperature during heating and drying, and more preferably lower than the heating temperature by 5° C. or more. For example, when the heating temperature is 60° C., the lowest film forming temperature of the resin is preferably from 0° C. to 55° C., and more preferably from 25° C. to 55° C. The film forming property is better as the lowest film forming temperature is lower, and a sufficient coating film thickness can be obtained when the lowest film forming temperature is higher than the glass transition temperature the film forming resins.

A surface hardness of the polycarbonate-based urethane resin particles when the polycarbonate-based urethane resin particles form a coating film is preferably 100 N/mm$^2$ or greater. When the surface hardness is 100 N/mm$^2$ or greater, the ink forms a strong coating film and has a greater scratch resistance.

A content of the polycarbonate-based urethane resin particles as a solid content equivalent value is preferably from 0.5% by mass to 10% by mass, more preferably from 1% by mass to 8% by mass, and particularly preferably from 3% by mass to 8% by mass of the whole amount of the white ink. When the content is 0.5% by mass or greater, a sufficient coating film can be formed over the colorant, and a required image fastness can be obtained. When the content is 10% by mass or lower, viscosity thickening can be suppressed, and easy jettability is ensured.

A content of the film forming resins relative to the total amount of the white ink is preferably from 1% by mass to 10% by mass, and in terms of coating film smoothness, a high gloss level, fixability to a base material, and jettability, more preferably from 5% by mass to 10% by mass. When the content is from 1% by mass to 10% by mass, fixability and stability of the white ink can be improved.

—Antiseptics/Mildewcides—

Examples of the antiseptics/mildewcides include 1,2-benzisothiazolin-3-one, sodium benzoate, sodium dehydroacetate, sodium sorbate, pentachlorophenol sodium, and sodium-2-pyridinethiol-1-oxide.

—Anti-Rust Agents—

Examples of the anti-rust agents include acid sulfites, sodium thiosulfates, ammonium thiodiglycolate, diisopropyl ammonium nitrite, pentaerythritol tetranitrate, and dicyclohexyl ammonium nitrite.

—pH Adjusters—

The pH adjusters are not particularly limited, and arbitrary pH adjusters may be selected according to the purpose as long as such pH adjusters can adjust pH to a desired level without adversely influencing the ink in which the pH adjusters are blended. Examples of the pH adjusters include: hydroxides of alkali metal elements, such as lithium hydroxide, sodium hydroxide, and potassium hydroxide; carbonates of alkali metals, such as lithium carbonate, sodium carbonate, and potassium carbonate; quaternary ammonium hydroxides; amines such as diethanol amine and triethanol amine; ammonium hydroxide; and quaternary phosphonium hydroxide.

—Method for Producing White Ink—

The white ink can be produced according to a method for dispersing or dissolving the colorant, the water-soluble organic solvent, a surfactant, a permeating agent, water, and according to necessity, other components in an aqueous medium, and appropriately stirring and mixing the materials. For the stirring and mixing, it is possible to use, for example, a sand mill, a homogenizer, a ball mill, a paint shaker, an ultrasonic disperser, a stirrer with a typical stirring blade, a magnetic stirrer, and a high-speed disperser.

—Properties of White Ink—

Properties of the white ink are not particularly limited, and may be appropriately selected according to the purpose. However, it is preferable that viscosity and static surface tension be in the ranges described below.

——Viscosity——

A viscosity of the white ink is preferably from 2 mPa·s to 20 mPa·s, and more preferably from 3 mPa·s to 15 mPa·s during jetting at 25° C. When the viscosity is 2 mPa·s or greater, the white ink tends not to have residual vibration when jetted, tends to restrain vibration shortly after jetted by a driving waveform, takes only a short time until the white ink is jetted next, and can be used favorably for high-speed printing. When the viscosity is 20 mPa·s or less, jettability can be improved. As the viscosity changes depending on the temperature of the environment of usage, it is preferable that the viscosity satisfy the range described above at the temperature in the environment of usage. The viscosity can be measured with, for example a viscometer (product name: RE-550L available from Toki Sangyo Co., Ltd.).

——Static Surface Tension——

The static surface tension is preferably from 20 mN/m to 40 mN/m, and more preferably from 20 mN/m to 35 mN/m at 25° C. When the static surface tension is from 20 mN/m to 40 mN/m, the white ink has a high wettability and can reduce bleeding over a recording medium, and can improve a color developing property because dots spread over the surface of the recording medium. When the static surface tension is 20 mN/m or greater, the white ink will not have an excessive wettability over a nozzle plate of an inkjet head, and can avoid remaining after maintenance as wiping spots that may cause unevenness in exuding and wettability of the white ink at the nozzle holes and inclined jetting and empty jetting of the white ink as well.

Examples of a method for jetting the white ink include: a so-called piezo method for using a piezoelectric element as a pressure generating unit configured to pressurize the white ink in an ink flow path to deform a vibrating plate forming a wall surface of the ink flow path and change the internal cubic capacity of the ink flow path to thereby jet ink droplets (see, e.g., Japanese Patent Application Publication (JP-B) No. 02-51734); a so-called thermal method for using a heating resistor to heat an ink in an ink flow path and generate bubbles (see, e.g., JP-B No. 61-59911); and an electrostatic method for disposing a vibrating plate forming a wall surface of an ink flow path and an electrode in a facing relationship and deforming the vibrating plate by means of an electrostatic force generated between the vibrating plate and the electrode to change the internal cubic capacity of the ink flow path to thereby jet ink droplets (see, e.g., JP-A No. 06-71882).

The white ink can be used in a printer or the like that has a function of heating a recording medium and the white ink at 50° C. to 200° C. during recording or before or after recording to thereby facilitate recording and fixing.

It is preferable that the white ink be prepared for being ink-jetted, more preferably for being heated and dried.

Examples of other applying methods include blade coating, bar coating, and roll coating.

(Ink Set)

Examples of an ink set of the present invention includes an ink set including a white ink and an ink free of hollow resin particles.

—Ink Set Including White Ink and Ink Free of Hollow Resin Particles—

The ink set including a white ink and an ink free of hollow resin particles includes a white ink and an ink free of hollow resin particles, and further includes other inks according to necessity.

When the white ink and any other ink are used in a manner that the white ink is applied, the image recorded by heating is fixed, and then the any other ink is applied over the coating film of the white ink, there is a tendency that the glass transition temperature of the hollow resin particles in the white ink lowers under influences of a solvent in the any other ink to thereby transparentize the white ink. Due to the transparentizing, an amount of light reflected from the coating film of the white ink is reduced, and there is not enough reflected light that can be utilized by the color of the any other ink formed over the coating film, leading to a problem that the any other ink cannot develop a color sufficiently.

In this regard, it has been discovered that use of the ink set including the white ink and the ink free of hollow resin particles makes it possible to apply the ink free of hollow resin particles over a coating film of the white ink without reducing the degree of whiteness of the coating film of the white ink, and hence without reducing color development of the ink free of hollow resin particles.

The white ink may be the same as the white ink of the present invention.

The ink free of hollow resin particles includes water and a water-soluble organic solvent, further includes other components according to necessity, and is free of hollow resin particles.

The water may be the same as the water used in the white ink of the present invention.

The water-soluble organic solvent may be the same as the water-soluble organic solvent used in the white ink of the present invention, and includes a diol having a boiling point of 240° C. or lower, having at least one hydroxyl group bonded to an alkane chain at a site other than terminals of the alkane chain, and having 4 to 6 carbon atoms.

The diol having a boiling point of 240° C. or lower, having at least one hydroxyl group bonded to an alkane chain at a site other than terminals of the alkane chain, and having 4 to 6 carbon atoms may be the same as the diol used in the white ink of the present invention, and having a boiling point of 240° C. or lower, having at least one hydroxyl group bonded to an alkane chain at a site other than terminals of the alkane chain, and having 4 to 6 carbon atoms.

A content of the diol having a boiling point of 240° C. or lower, having at least one hydroxyl group bonded to an alkane chain at a site other than terminals of the alkane chain, and having 4 to 6 carbon atoms is equal to or greater than 80% by mass of the total amount of the ink free of hollow resin particles.

Examples of the other components include colorants, surfactants, film forming resins, antiseptics/mildewcides, anti-rust agents, and pH adjusters.

The colorants may be the same as the other coloring components used in the white ink of the present invention.

The surfactants, the film forming resins, the antiseptics/mildewcides, the anti-rust agents, and the pH adjusters may be the same as the surfactants, the film forming resins, the antiseptics/mildewcides, the anti-rust agents, and the pH adjusters used in the white ink of the present invention.

(Ink Cartridge)

An ink cartridge of the present invention stores the white ink in a container, and further includes other members appropriately selected according to necessity.

The container is not particularly limited, and the shape, structure, size, material, etc. of the container may be appropriately selected according to the purpose. Examples of the container include a container including at least an ink bag made of an aluminium laminate film, a resin film, or the like.

Next, the ink cartridge will be described with reference to FIG. 1 and FIG. 2.

Figure 2:
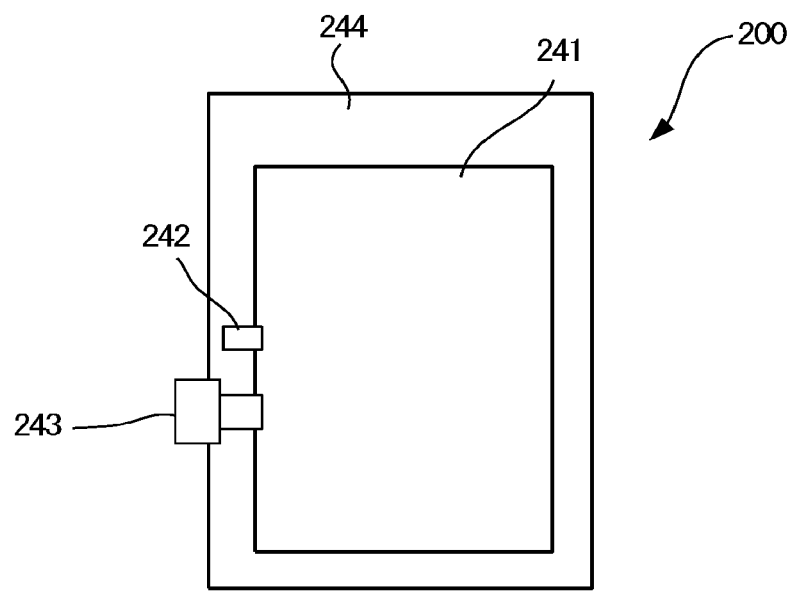
FIG. 2 is a schematic diagram illustrating the inkjet cartridge of FIG. 1 including a case of the inkjet cartridge.

FIG. 1 is a schematic diagram illustrating the ink cartridge. FIG. 2 is a schematic diagram illustrating the inkjet cartridge of FIG. 1 including a case 200 of the inkjet cartridge.

As illustrated in FIG. 1, an ink bag 241 is filled with the white ink through an ink injecting port 242, which, after deaeration, is closed by heat sealing.

In use, an ink discharging port 243 made of a rubber material is pierced with a needle of a below-described inkjet recording apparatus body 101 of the present invention, for the white ink to be supplied into the inkjet recording apparatus body 101. The ink bag 241 is formed of a packing material having a low air permeability such as aluminium laminate film. As illustrated in FIG. 2, the ink bag 241 is typically stored in a cartridge case 244 made of plastic, and is used as detachably attached in various types of inkjet recording apparatuses. The ink cartridge stores the white ink, can be used as detachably attached in various types of inkjet recording apparatuses, and is preferably used as detachably attached in the below-described inkjet recording apparatus 101 of the present invention.

(Inkjet Recording Method and Inkjet Recording Apparatus)

The inkjet recording method includes at least an ink delivering step of flying a white ink to deliver the white ink onto a recording medium and a heating step of heating and drying the recording medium over which an image has been recorded. It is preferable that the heating step include at least a first heating treatment of heating the recording medium and a second heating treatment of applying hot air to the recording medium. The inkjet recording method further includes other steps appropriately selected according to necessity, such as a stimulus generating step and a controlling step.

The inkjet recording apparatus includes at least an ink delivering unit configured to fly a white ink to deliver the white ink onto a recording medium and a heating unit configured to heat and dry the recording medium over which an image has been formed. It is preferable that the heating unit include at least a first heating member configured to heat the recording medium and a second heating member configured to apply hot air to the recording medium. The inkjet recording apparatus further includes other units appropriately selected according to necessity, such as a stimulus generating unit and a controlling unit.

The inkjet recording method can be favorably carried out by the inkjet recording apparatus. The ink delivering step can be favorably performed by the ink delivering unit. The first heating treatment in the heating step can be favorably performed by the first heating member in the heating unit. The second heating treatment in the heating step can be favorably performed by the second heating member in the heating unit. The other steps can be favorably performed by the other units.

<Ink Delivering Step and Ink Delivering Unit>

The ink delivering step is a step of applying a stimulus (energy) to the white ink to fly the white ink and form an image over a recording medium.

The ink delivering unit is a unit configured to apply a stimulus (energy) to the white ink to fly the white ink and form an image over a recording medium.

The ink delivering unit is not particularly limited, and examples of the ink delivering unit include various nozzles for ink jetting.

The stimulus (energy) can be generated by, for example, the stimulus generating unit. The stimulus is not particularly limited, and an arbitrary stimulus may be selected according to the purpose. Examples of the stimulus include heat (temperature), pressure, vibration, and light. One of these may be used alone, or two or more of these may be used in combination. Among these, heat and pressure are preferable.

Examples of the stimulus generating unit include a heating device, a pressurizing device, a piezoelectric element, a vibration generating device, an ultrasonic oscillator, and a light. Further examples include: a piezoelectric actuator such as a piezoelectric element; a thermal actuator with an electro-thermal transducing element such as a heating resistor to utilize a phase change due to film boiling of a liquid; a shape-memory alloy actuator utilizing a phase change of the metals due to temperature change; and an electrostatic actuator utilizing an electrostatic force.

In use of the ink set of the present invention including the white ink and the ink free of hollow resin particles, it is preferable that the inkjet recording method include a white ink applying step of applying the white ink over a recording medium and a step of, after a coating film is formed in the white ink applying step, applying the ink free of hollow resin particles over the coating film. It is preferable that an amount of the white ink applied be greater than an amount of the ink free of hollow resin particles applied, and more preferably be from 10 g/m² to 100 g/m². Note that the amount of the ink free of hollow resin particles applied refers to a total amount of all color inks applied.

The size of liquid droplets of the white ink to be delivered onto the recording medium is preferably from $3 \times 10^{-15}$ m³ to $40 \times 10^{-15}$ m³ (from 3 pL to 40 pL).

The speed at which the white ink to be delivered onto the recording medium is jetted is preferably from 5 m/s to 20 m/s.

A driving frequency of driving the white ink to be delivered onto the recording medium is preferably 1 kHz or higher.

The resolution of an image obtained with the white ink delivered onto the recording medium is preferably 60 dpi or higher, and more preferably 150 dpi or higher.

Examples of the ink delivering unit include an inkjet head. Examples of the inkjet head include an inkjet head including a liquid chamber, a fluid resistance member, a vibrating plate, and a nozzle member that are made of a material at least partially including a stainless steel (SUS), silicon, or nickel, or any combinations thereof.

The stainless steel can be used with inks of various pH levels and has a high thermal conductivity. Hence, the inkjet head formed of stainless steel members can provide an improved temperature adjustability.

The silicon can be machined with techniques for semiconductors and techniques for micro electro mechanical systems (MEMS), and hence can be machined very finely and highly precisely.

The nickel can be formed into a metallic thin film with electrocasting techniques, and hence can be formed into a highly precise shape.

The nickel easily dissolves under acidic conditions, and is hence rather poor in usability with inks. However, an alloy of the nickel with palladium or the like can be electrocast into a metallic thin film member having a high durability and excellent machinability.

A nozzle diameter of the nozzles of the inkjet head is preferably 50 μm or less, and more preferably from 10 μm to 30 μm.

<Heating Step and Heating Unit>

It is preferable that the inkjet recording method include a heating step of heating and drying the recording medium onto which the white ink has been delivered.

It is preferable that the inkjet recording apparatus include a heating unit configured to heat and dry the recording medium onto which the white ink has been delivered.

The heating step of the inkjet recording method preferably includes a first heating treatment, more preferably includes a second heating treatment after the first heating treatment.

The heating unit of the inkjet recording apparatus preferably includes a first heating member, and preferably includes a second heating member in addition to the first heating member.

<<First Heating Treatment in Heating Step and First Heating Member of Heating Unit>>

The inkjet recording method may include the first heating treatment in the heating step in order to promote fixing and drying of the white ink over the recording medium onto which the white ink has been flown and delivered.

For also the ink set including the white ink and the ink free of hollow resin particles, the first heating treatment may be provided in the heating step in order to promote fixing and drying of the white ink over the recording medium onto which the white ink has been flown and delivered.

Examples of the first heating member in the heating unit include an infrared dryer, a microwave dryer, a roll heater, and a drum heater.

By providing the first heating treatment in the heating step and the first heating member in the heating unit, it is possible to promote drying and fixing of the white ink immediately after the white ink is attached onto the recording medium and suppress moving of the white ink over the coating film of the white ink. This makes it possible to suppress beading and bleeding and improve printability over the recording medium and image quality. Further, promotion of the drying makes it easier for the resin components in the white ink components to form a coating film, and can improve fixability immediately after recording.

In order to promote drying and fixing during the recording, it is necessary to heat the recording medium before printing or heat the recording medium during printing. As the heating temperature, it is preferable that the recording medium under heating conditions have a temperature of from 40° C. to 70° C. below the inkjet head. When the heating temperature is 40° C. or higher, it is possible to promote vaporization of the white ink over the recording medium and suppress beading of the white ink. When the heating temperature is 70° C. or lower, it is possible to suppress empty jetting that is caused by the inkjet head being also warmed incidentally to have the jetting nozzles dry. Furthermore, as the softening temperature of the hollow resin particles has lowered below the glass transition temperature under influences of the components in the white ink, the heating temperature of 70° C. or lower can prevent the hollow resin particles from being damaged under such influences and losing the hollow shape. Moreover, when the heating temperature is in the range described above, it is possible to obtain a favorable image including no color bleed or dot amalgamation, and form a favorable image expressing a white color with the shape of the hollow resin particles maintained.

The heating time of the first heating treatment in the heating step is preferably from 10 seconds to 600 seconds.

The heating temperature around the inkjet head is preferably from 40° C. to 60° C. as the temperature below the inkjet head, lest the menisci at the head nozzles be dried to impair jettability. The heating may be performed by the first heating treatment in the heating step. In the first heating treatment in the heating step, it is preferable to change heating conditions depending on the printing conditions, and it is more preferable to use a capacitor in combination in order to accommodate electricity used for immediate heating.

The heating temperature may be varied depending on the kinds and amounts of the water-soluble organic solvents included in the white ink and a lowest film forming temperature of a water-dispersible resin to be added, and may also be varied depending on the kind of the recording medium to be printed. It is preferable that the heating temperature be higher, in terms of a drying property and a film forming temperature of a water-dispersible resin.

As the result of earnest studies, it has been found preferable to perform the heating at a temperature lower than the glass transition temperature of the hollow resin particles by 30° C. or more in order to prevent the hollow resin particles from damages and keep the hollow shapes of the hollow resin particles. At the heating temperature lower than that temperature, it is possible to suppress softening of the hollow resin particles, and prevent the hollow resin particles from being suddenly broken in shape by the second heating treatment in the heating step and forming a coating film that is free of hollows and does not express a white color. Further, for also the ink set including the white ink and the ink free of hollow resin particles, it is preferable that the heating temperature in the first heating treatment after application of the white ink be lower than the glass transition temperature of the hollow resin particles by 30° C. or more for the same reason as described above.

When the heating temperature in the first heating treatment in the heating step is 70° C. or lower, it is possible to suppress damages on the recording medium, and suppress high temperature-attributed thermal contraction that causes an unfavorable change not only in the image, but also in the shape of the recording medium when the recording medium is particularly a vinyl chloride film, although heat resistance depends on the water-dispersible resin.

The recording may also be followed by a drying step of performing heating by the second heating treatment in the heating step. This can promote drying of the coating film and fixing of the white ink. Also in the heating after the recording, it is preferable to perform heating at a temperature lower than the glass transition temperature of the hollow resin particles by 30° C. or more in order to prevent the hollow resin particles from being damaged by heating.

<<Second Heating Treatment in Heating Step and Second Heating Member of Heating Unit>>

The inkjet recording method may include the second heating treatment in the heating step in order to promote fixing and drying of the white ink over the recording medium that has been through the first heating treatment in the heating step.

For also the ink set including the white ink and the ink free of hollow resin particles, the second heating treatment may be provided in the heating step in order to promote fixing and drying of the white ink over the recording medium that has been through the first heating treatment in the heating step.

Examples of the second heating member of the heating unit for the second heating treatment in the heating step include a resistive heating system using a heating wire as a heat generating source for heating air, an induction heating system such as an IH heater, a dielectric heating system such as high-frequency induction heating, a microwave heating system such as a microwave oven, and an infrared heating system such as a halogen heater. Examples of a heat source for the infrared heating system include various heat sources such as a nichrome wire heating element, a halogen lamp, a halogen heater, and a ceramic heater, and the heat source may be a complicated shape.

By warming the air with the heat source and sending the resulting hot air with a blower including a motor and a fan, it is possible to promote drying and fixing of the white ink over the recording medium that has been subjected to drying by the first drying treatment in the heating step, and completely fix the white ink over the recording medium.

By drying the white ink with the hot air, it is possible to remove vapors of the water and the water-soluble organic solvents included in the white ink from the surface of the recording medium, and dry the white ink more effectively than without air. The second heating treatment in the heating step makes it easier for the resin component in the white ink components to form a film, can promote drying of the solvent components in the hollow resin particles, and can improve fixability and white color develop ability.

The temperature of the hot air is not particularly limited, and needs only to be a temperature at which volatilization of the solvents in the white ink by air blowing can be promoted. However, because the temperature of the coating film tends to drop due to vaporization heat of the water and the like, it is preferable to apply hot air having a temperature equal to or higher than the heating temperature in the first heating treatment in the heating step in order to suppress dropping of the temperature of the coating film. The temperature of the hot air is preferable from 40° C. to 100° C., and particularly preferably from 50° C. to 80° C. Such a temperature can improve the drying property and maintain the shape of the hollow resin particles.

The heating time of the second heating treatment in the heating step is preferably from 60 seconds to 1,800 seconds.

As the results of earnest studies for use of the second heating member of the heating unit, it has been discovered that drying can be performed in the second heating treatment in the heating step in a manner that the shape of the hollow resin particles can be maintained, provided that drying is performed in the first heating treatment in the heating step until the content of the water-soluble organic solvents in the white ink becomes 20% by mass or less. When the content is 20% by mass or less, the hollow resin particles can be suppressed from softening under influences of water-soluble resin particles, and can maintain the shape even under heat of the hot air.

Examples of a method for analyzing the content of the water-soluble organic solvents in the white ink include a method for calculating the content from a weight reduction obtained by thermogravimetry, quantitation assay of vaporized components by gas chromatography, quantitation assay of dissolved components by liquid chromatography, quantitation assay of functional groups by infrared absorption spectral ATR, and quantitation assay of a structure by NMR of $^1H$ and $^{13}C$.

The second heating member of the heating unit may be used in combination with a heating unit on the back side of the recording medium. By providing the heating unit on the back side of the recording medium, it is possible to improve the drying property and reduce the temperature of the hot air.

The controlling unit is not particularly limited, and an arbitrary controlling unit may be selected according to the purpose as long as the arbitrary controlling unit is capable of controlling the operations of each unit. Examples of the controlling unit include devices such as a sequencer and a computer.

—Inkjet Recording Apparatus—

The inkjet recording apparatus of the present invention will be described below with reference to the drawings.

Figure 3:
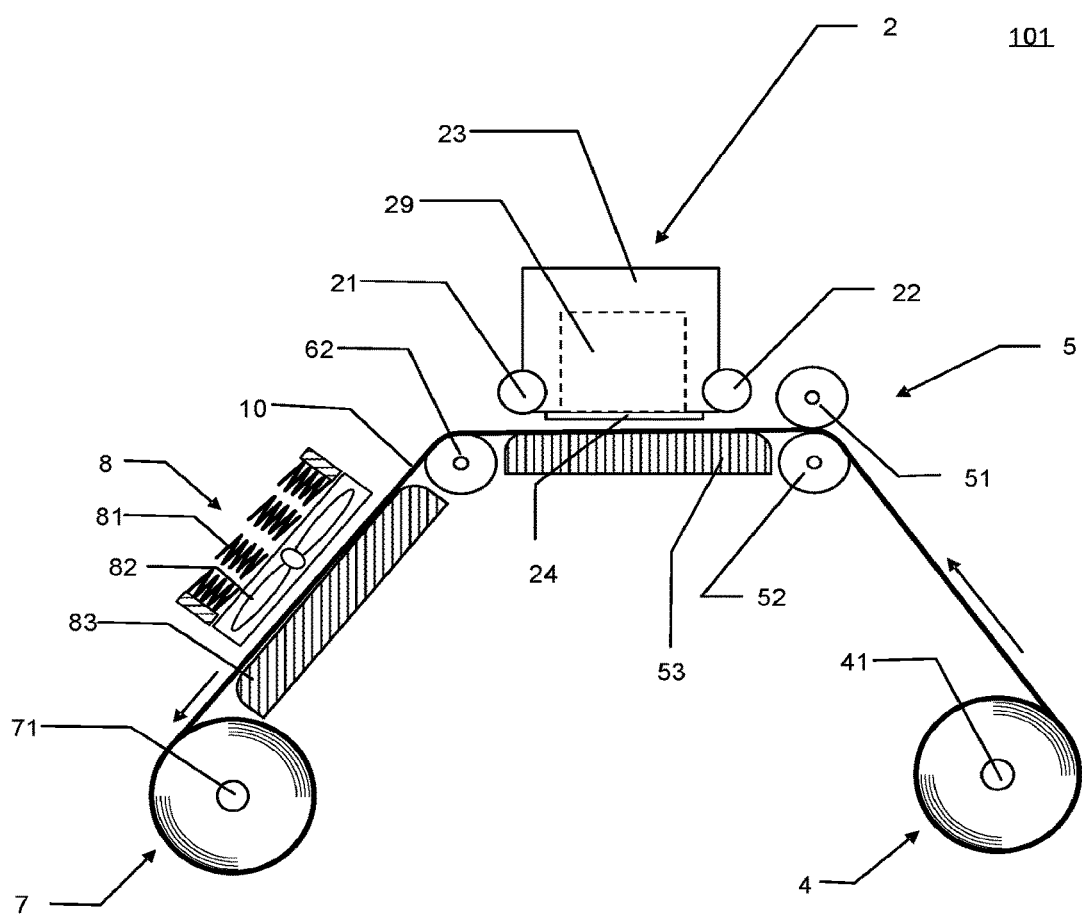
FIG. 3 is a diagram depicting a side elevational view of a main part of an inkjet recording apparatus.
Figure 4:
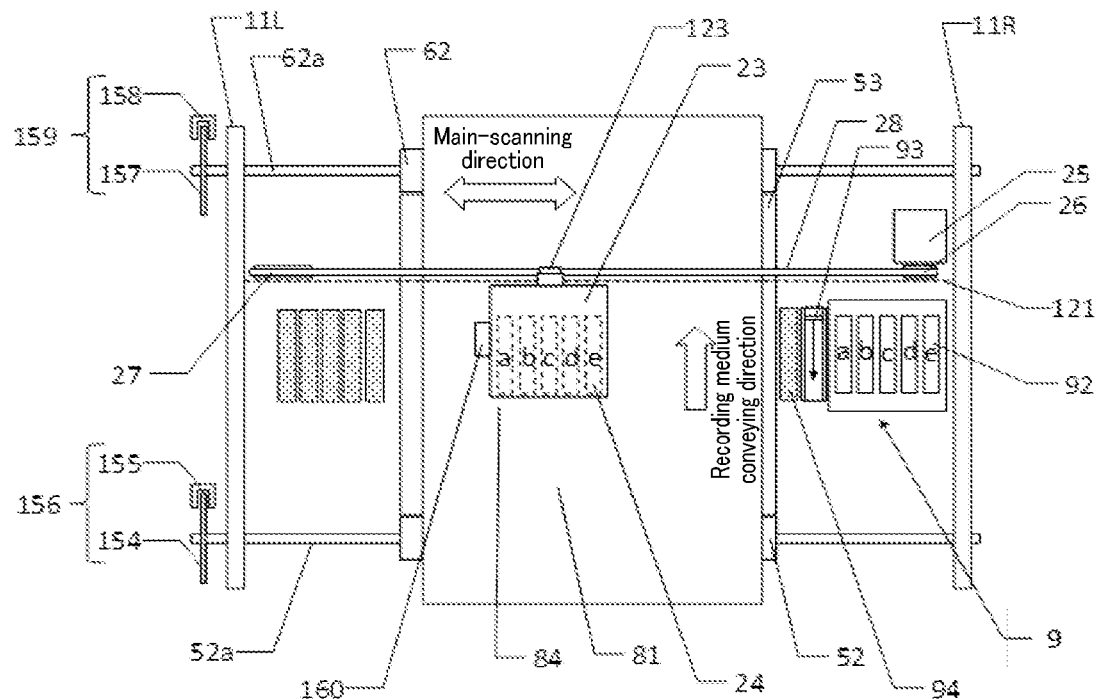
FIG. 4 is a diagram depicting a bottom view of a main part observed when an image forming unit of FIG. 3 is seen from the bottom.
Figure 5:
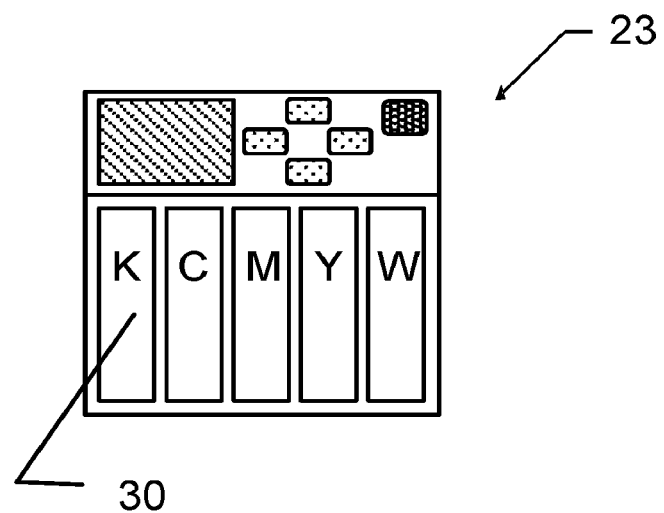
FIG. 5 is a diagram depicting a bottom view of a main part observed when a carriage of FIG. 3 is seen from the bottom.

First, the inkjet recording apparatus of the present invention will be described with reference to FIG. 3, FIG. 4, and FIG. 5. FIG. 3 is a diagram depicting a side elevational view of a main part of the inkjet recording apparatus. FIG. 4 is a diagram depicting a bottom view of a main part observed when an image forming unit 2 of FIG. 3 is seen from the bottom. FIG. 5 is a diagram depicting a bottom view of a main part observed when a carriage 23 of FIG. 3 is seen from the bottom.

The inkjet recording apparatus is a serial type inkjet recording apparatus. As illustrated in FIG. 3, the inkjet recording apparatus includes an image forming unit 2, a conveying mechanism unit 5, ink cartridges 30, inkjet recording heads 24, etc. in the inkjet recording apparatus body. The inkjet recording apparatus is configured to send forth a recording medium 10 from a sending unit 4 at a side of the inkjet recording apparatus body, intermittently convey the recording medium 10 in a horizontal direction by the conveying mechanism unit 5, record a required image by jetting liquid droplets vertically downward by the image forming unit 2, change the direction of the recording medium by making the recording medium trail over an ejecting roller 62, eject the recording medium 10 over which an image has been recorded, and take up the recording medium 10 on a take-up unit 7.

As illustrated in FIG. 4, the image forming unit 2 holds the carriage 23 mounted with the inkjet heads 24 in a manner that the carriage 23 is slidable on a main guide member 21 and a sub guide member 22 provided in a lateral bridging manner between left and right side panels 11L and 11R. The image forming unit 2 is configured to move and scan the carriage 23 in a main-scanning direction by means of a main-scanning motor 25 via a timing belt 28 passed between a driving pulley 26 and a driven pulley 27.

The carriage 23 is mounted with the inkjet heads 24a, 24b, 24c, 24d, and 24e including liquid jetting heads configured to jet ink droplets of yellow (Y), magenta (M), cyan (C), black (K), and white (W) colors, respectively (the inkjet heads will be referred to as "inkjet recording heads 24" as described above when the ink jet heads are not distinguished from one another). The inkjet heads 24a, 24b, 24c, 24d, and 24e are mounted in the carriage 23 such that a plurality of nozzles of each inkjet head forms a nozzle line in a sub-scanning direction perpendicular to the main-scanning direction, and such that a droplet jetting direction of each inkjet head is vertically downward.

Examples of the liquid jetting head constituting each inkjet head 24 include liquid jetting heads that include as a pressure generating unit configured to generate pressure for jetting liquid droplets, a piezoelectric actuator such as a piezoelectric element, a thermal actuator with an electro-thermal transducing element such as a heating resistor to utilize a phase change due to film boiling of a liquid, a shape-memory alloy actuator utilizing a phase change of the metals due to temperature change, an electrostatic actuator utilizing an electrostatic force, etc.

The carriage 23 may also be mounted with a liquid jetting head configured to jet a fixing liquid that improves fixability of the ink by reacting with the ink.

The carriage 23 is also mounted with head tanks 29 configured to supply the inks of the respective colors to the corresponding nozzle lines of the inkjet recording heads 24. The head tanks 29 are supplied with the inks from the ink cartridges 30 (main tanks) prepared for the respective colors and detachably attached in the apparatus body.

Because the droplet jetting direction of the inkjet recording heads 24 is vertically downward, it is necessary to form a negative pressure in order to prevent liquid dripping. The head tanks 29 have a function as buffer tanks and also a negative pressure maintaining function at the same time.

An encoder scale 121 over which a predetermined pattern is formed is provided in a tensed manner between both of the side panels 11L and 11R along the main-scanning direction of the carriage 23. The carriage 23 includes an encoder sensor (unillustrated) including a transmission photosensor configured to read the pattern over the encoder scale 121. The encoder scale 121 and the encoder sensor constitute a linear encoder (main-scanning encoder) 123 configured to sense a move of the carriage 23.

A maintaining/recovering mechanism 9 configured to maintain or recover the conditions of the nozzles of the inkjet heads 24 is provided at a non-printing region at one side in the scanning direction of the carriage 23.

The maintaining/recovering mechanism 9 includes caps 92a, 92b, 92c, 92d, and 92e configured to cap the nozzle surfaces of the inkjet heads 24 (the caps will be referred to as "caps 92" when the caps are not distinguished from one another), a wiper member (wiper blade) 93 configured to wipe the nozzle surfaces, a blank jet receptacle 94 configured to receive liquid droplets of blank jetting for jetting liquid droplets that do not contribute to recording in order to dispose of a thickened recording liquid, etc.

The recording medium 10 for recording is wound around a paper sending pipe 41 of the sending unit 4. The recording medium 10 is sent to between a pair of upper and lower feed-in rollers 51 and 52 of the conveying mechanism unit 5, sent along a first platen 53, made to trail over the ejecting roller 62, secured over a paper take-up pipe 71 of the take-up unit 7, and taken up around the paper take-up pipe 71 upon rotation of the paper take-up pipe 71 by a motor.

A shaft 52a of the feed-in roller 52 is fitted with a code wheel 154 and an encoder sensor 155 including a transmission photosensor configured to detect a pattern formed over the code wheel 154. The code wheel 154 and the encoder sensor 155 constitute a rotary encoder (a feed-in encoder) 156 configured to detect an amount of rotation and an angle of rotation of the feed-in roller.

Likewise, a shaft 62a of the ejecting roller 62 is fitted with a code wheel 157 and an encoder sensor 158 including a transmission photosensor configured to detect a pattern formed over the code wheel 157. The code wheel 157 and the encoder sensor 158 constitute a rotary encoder (an ejecting encoder) 159 configured to detect an amount of rotation and an angle of rotation of the ejecting roller.

The feed-in roller 51 and the take-up unit 7 are controlled to rotate by the same amount, or the take-up unit is controlled to rotate by a slightly higher amount, in order to apply a tension to the recording medium 10 over the first platen 53 in the conveying direction and prevent the recording medium 10 from floating.

In the inkjet recording apparatus configured as described above, the recording medium 10 is sent from the sending unit 4 in a horizontal direction by such a conveying amount at a time as corresponding to one scanning. The first platen 53 is arranged at a position corresponding to a recording area of the inkjet heads 24. The first platen 53 is embedded with a heater and can heat the recording medium 10 from the opposite side from the recording surface. The first platen 53 is configured to heat the recording medium 10.

The carriage 23 is moved to drive the inkjet heads 24 in accordance with a recording signal to jet ink droplets downward onto a stopped recording medium 10 from above the recording medium and record one line over the recording medium. Then, the recording medium 10 is conveyed by the predetermined amount, and the next line is recorded over the recording medium. The recording medium 10 that has been through the recording operation is ejected from the recording area. The ejected recording medium 10 is heated in a manner that the recording surface is blown with hot air by a hot air unit 8 including a blower fan 82 and a heater 81. A second platen 83 is provided in a manner to face the blower fan 82, and prevents the recording medium 10 from being curled by the hot air. The second platen 83 is also embedded with a heater, and heats the recorded recording medium 10 from the back side and promotes drying of the recording medium 10. The recording surface of the recording medium 10 is dried in a contactless manner because the recording medium 10 and the hot air unit 8 do not contact each other. Then, the recording medium 10 is taken up on the take-up unit 7.

When the inkjet recording inks in the head tanks 29 are detected to have been almost consumed, the inkjet recording inks are replenished in a predetermined amount into the head tanks 29 from the ink cartridges 30. For maintenance/recovery of the nozzles of the inkjet heads 24, the carriage 23 is moved to a home position, which is a position facing the maintaining/recovering mechanism 9, capped with the caps 92, and subjected to a maintaining/recovering operation such as nozzle suctioning for suctioning the nozzles for disposal and blank jetting for jetting liquid droplets that do not contribute to image formation. Such maintenance/recovery enables image formation based on stable liquid droplet jetting.

Figure 6:
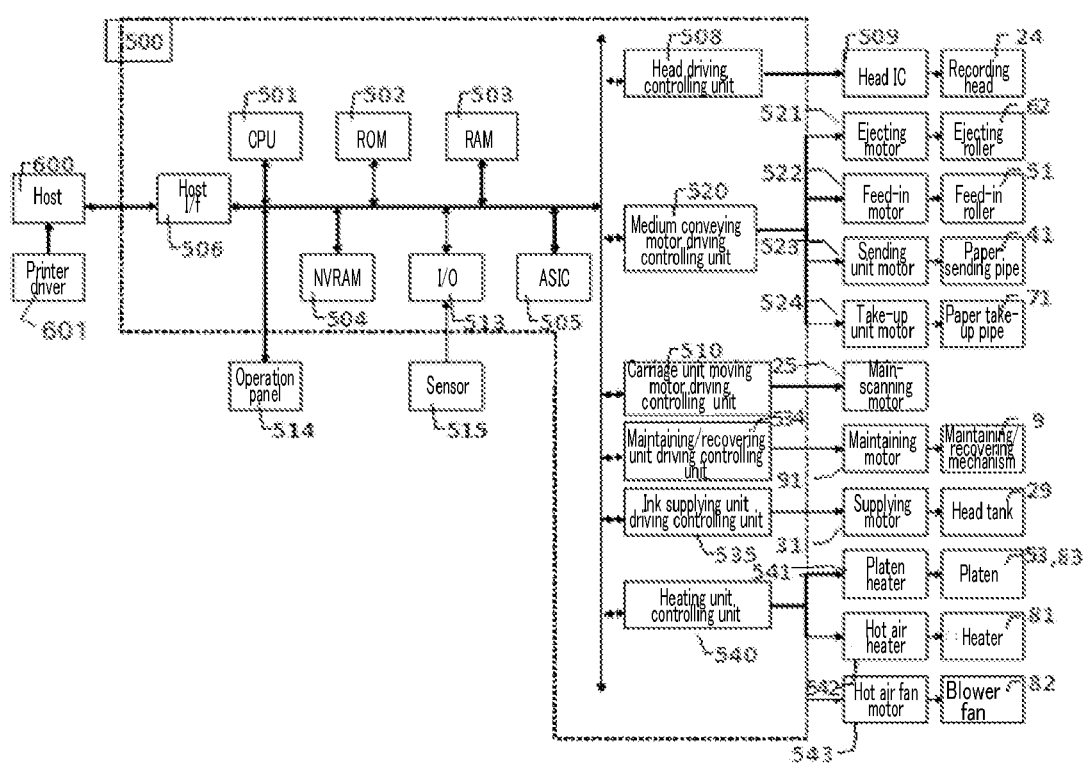
FIG. 6 is a block diagram depicting a controlling unit of an inkjet recording apparatus.

Next, the controlling unit of the inkjet recording apparatus will be outlined with reference to the block diagram of FIG. 6.

The controlling unit 500 includes a CPU 501 configured to control the inkjet recording apparatus on the whole, various programs including a program for the CPU 501 to execute controls (processes) according to the present invention, a ROM 502 configured to store any other fixed data, a RAM 503 configured to temporarily store recording data, etc., a rewritable nonvolatile memory (NVRAM) 504 configured to retain data also while the inkjet recording apparatus is turned off, and an ASIC 505 configured to execute various signal processes to the recording data and image processes for rearrangement, etc., and process input/output signals for controlling the inkjet recording apparatus on the whole.

The controlling unit 500 also includes an inkjet head driving controlling unit 508 including a data transmitting unit and a driving signal generating unit that are configured to control driving of the inkjet heads 24, and an inkjet head driver (inkjet head IC) 509 configured to drive the inkjet heads 24 and provided near the carriage 23.

The controlling unit 500 further includes a carriage unit moving motor driving controlling unit 510 configured to control driving of the main-scanning motor 25 configured to move and scan the carriage 23.

The controlling unit 500 further includes a sending unit motor 523 configured to rotate the paper sending pipe 41 around which a recording medium 10 before recording is wound to send forth the recording medium 10, a feed-in motor 522 configured to rotate the feed-in roller 51 to feed the recording medium 10 into the recording unit and maintain the feed-in roller 51 at the position, an ejecting motor 521 configured to rotate the ejecting roller 62 configured to eject the recording medium from the recording unit and maintain the ejecting roller 62 at the position, a take-up unit motor 524 configured to rotate the paper take-up pipe 71 around which the ejected recording medium is taken up, and a medium conveying motor driving controlling unit 520 configured to control driving of these motors.

An operation panel 514 configured to enter and display information necessary for the inkjet recording apparatus is coupled to the controlling unit 500.

The controlling unit 500 includes a host I/F 506 through which the controlling unit 500 exchanges data and signals with a host, and receives at the host I/F 506, data and signals from the host 600 that may be, for example, an image processing apparatus such as a personal computer, an image reading apparatus such as an image scanner, and an imaging apparatus such as a digital camera through a cable or a network.

The CPU 501 of the controlling unit 500 reads out recording data in a recording buffer included in the host I/F 506, and analyzes the recording data. The ASIC 505 applies necessary image processes, a data rearranging process, etc. to the recording data. The inkjet head driving controlling unit 508 transfers the recording data to the inkjet head IC 509. Note that dot pattern data for image output is produced by a printer driver 601 of the host 600.

The inkjet head driving controlling unit 508 transfers the recording data in the form of serial data, and also outputs a transfer clock, a latch signal, a controlling signal, etc. necessary for the transfer of the recording data and establishment of the transfer. In addition, the inkjet head driving controlling unit 508 includes a driving signal generating unit including a D/A converter configured to convert data stored in the ROM and representing a pattern of a driving pulse from digital to analog, a voltage amplifier, a current amplifier, etc., and outputs a driving signal composed of a driving pulse or a plurality of driving pulses to the inkjet head IC 509.

The inkjet head IC 509 receives recording data corresponding to one line of the inkjet heads 24 serially, and drives the inkjet heads 24 by applying, based on the received recording data, the driving pulse constituting the driving signal supplied from the inkjet head driving controlling unit 508 selectively to driving elements (e.g., piezoelectric elements) included in the inkjet heads 24 and configured to generate energy for jetting liquid droplets.

In this case, the driving pulse constituting the driving signal may be designated in a manner to jet liquid droplets different in droplet amount, such as large liquid droplets, middle liquid droplets, and small liquid droplets, and enable selective jetting of dots different in size.

An I/O 513 acquires information from the main-scanning encoder 123, the feed-in encoder 156, the ejecting encoder 159, and various sensors 515 mounted in the inkjet recording apparatus, and extracts information necessary for controlling the printer. The extracted information is used for controlling the inkjet head driving controlling unit 508, the carriage unit moving motor driving controlling unit 510, the medium conveying motor driving controlling unit 520, a maintaining/recovering unit driving controlling unit 534, an ink supplying unit driving controlling unit 535, and a heating unit controlling unit 540.

The sensors 515 include an optical sensor (a medium sensor) 160 provided in the carriage 23 and configured to detect the position of the recording medium 10, a thermistor configured to monitor temperature and humidity in the apparatus, and an interlock switch configured to detect opening/closing of respective covers of the apparatus. The I/O 513 is capable of processing various sensor information.

For example, the CPU 501 drives the main-scanning motor 25 via the carriage unit moving motor driving controlling unit 510 based on a driving output value (a control value) calculated for the main-scanning motor 25 based on a detected velocity value and a detected position value obtained by sampling a detected pulse from the encoder sensor (unillustrated) constituting the main-scanning sensor 123 and a target velocity value and a target position value obtained from previously stored velocity/position profiles.

Likewise, the feed-in motor 522 is driven via the medium conveying motor driving controlling unit 520 based on a driving output value (a control value) calculated for the feed-in motor 522 based on a detected velocity value and a detected position value obtained by sampling a detected pulse from the encoder sensor 155 constituting the feed-in encoder 156 and a target velocity value and a target position value obtained from previously stored velocity/position profiles. Likewise, the ejecting motor 521 is driven via the medium conveying motor driving controlling unit 520 based on a detected pulse from the ejecting encoder 159.

The controlling unit 500 drives a maintaining motor 91 via the maintaining/recovering unit driving unit 534 to move the caps 92 of the maintaining/recovering mechanism 9 toward or away from the nozzle surfaces of the inkjet heads 24, move the wiper member 93, and drive a suction pump.

Likewise, a supplying motor 31 is driven via the ink supplying unit driving controlling unit 535 to actuate a supplying pump to deliver the inks from the ink cartridges 30 to the head tanks 29 or reversely deliver the inks from the head tanks 29 to the ink cartridges 30.

The heating unit controls a platen heater 541 based on information sensed by the sensor 515 and sent from the I/O 513 to adjust the temperature of the first platen 53. Likewise, the temperature and air flow of the hot air unit are sensed by the sensor 515, and the hot air unit generates hot air by controlling a hot air heater 542 to change the temperature of the heater 81 and controlling a hot air fan motor 543 to rotate the blower fan 82 based on the sensed values.

When an abnormal state is detected by the encoder sensors and the medium conveying motor driving controlling unit 520, the heating unit controlling unit 540 weakens the output levels of, or stops the platen heater 541 and the hot air heater 542 to thereby stop heating and suppress heat accumulation in the recording medium 10. Further, the heating unit controlling unit 540 drives the hot air fan motor 543 to rotate the blower fan 82 to cool the hot air heater 542 and the recording medium and stop the hot air heater 542 and the recording medium safely.

When the inkjet ink in the ink cartridge in the inkjet recording medium is used up, it is possible to disassemble the housing of the ink cartridge and replace only the ink bag 241 put inside the ink cartridge.

The example described above is a case where the present invention is applied to a serial type (shuttle type) inkjet recording apparatus in which the carriage 23 is scanned. However, the present invention can also be applied to a line inkjet recording apparatus including a line head. The line inkjet recording apparatus cannot perform multi-path recording, but can obtain the same results as obtained by multi-path recording of the serial type inkjet recording apparatus by using an inkjet head arrangement in which a plurality of inkjet heads for the same color are arranged on the recording path. The line inkjet recording apparatus can improve the image quality of a recorded matter by setting the surface temperature of a non-porous base material lower as the number of line heads for the same color is larger, instead of lowering the surface temperature of the non-porous base material as the number of image recording scans increases.

Figure 7:
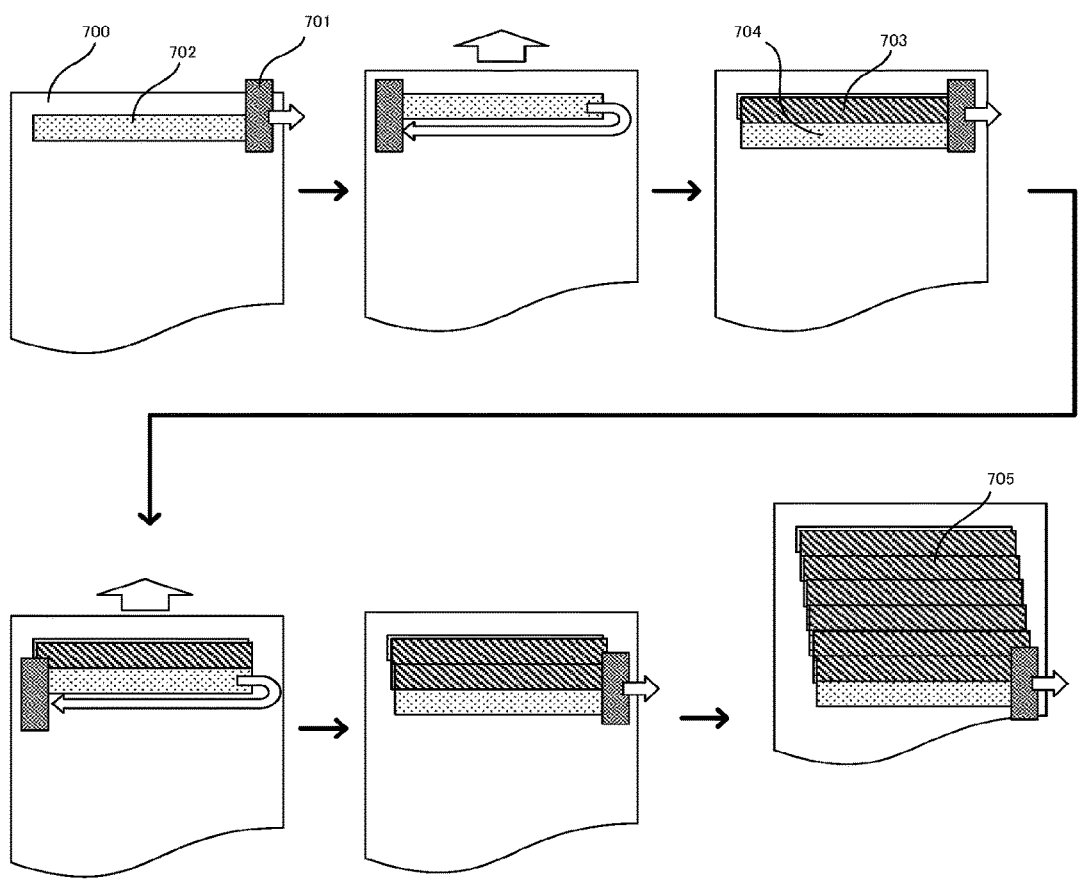
FIG. 7 is diagram depicting an inkjet recording method for recording images in an overlapping manner.

FIG. 7 is a diagram depicting an inkjet recording method for recording images in an overlapping manner. As illustrated in FIG. 7, first, an inkjet head 701 delivers an ink onto a recording medium 700 and records a recorded image 702 over the recording medium 700 by using nozzles at a longer-direction lower half of the inkjet head 701. After this, the recording medium 700 is sent forth by an amount corresponding to the length of the longer-direction half of the inkjet head 701. Then, the inkjet head 701 delivers the ink onto the recording medium 700 and records a recorded image 704 over the recording medium 700 by using the nozzles at the longer-direction lower half of the inkjet head 701 in the same manner as described above, while at the same time, delivering another ink onto the recorded image 702 and recording a recorded image 703 of the another ink over the recorded image 702 by using nozzles at a longer-direction upper half of the inkjet head 701. By repeating this operation, it is possible to form an overlap image 705 favorably.

The inkjet recording apparatus and the inkjet recording method of the present invention can be applied to various types of recording by inkjet recording, and can be applied particularly favorably to, for example, inkjet recording printers, facsimile machines, copiers, printer/fax/copier multi-function peripherals.

<Inkjet Recorded Matter>

The inkjet recorded mater includes an image formed over a recording medium with the white ink of the present invention.

The recording medium is not particularly limited, and examples of the recording medium include regular paper, gloss paper, special paper, and cloth. The white ink of the present invention can provide an image having a particularly favorable color development when the white ink is applied over a transparent film and a colored recording medium.

Examples of the transparent film include films made of plastic materials such as polyvinyl chloride films, polyethylene terephthalate (PET) films, polycarbonate films, acrylic films, polypropylene films, polyimide films, and polystyrene films.

Examples of the colored recording medium include colored paper, the transparent films that are colored, cloth, clothes, and ceramic. In color printing, previous printing of the white ink before inks can make the recording medium uniformly white and improve color development of the inks.

EXAMPLES

The present invention will be described below by way of Examples and Comparative Examples. The present invention is not limited to these Examples. "Part" presented in Examples and Comparative Examples represents "part by mass", unless otherwise expressly specified. The term "total amount of the water-soluble organic solvent" refers to a total amount including also the amount of water-soluble organic solvent components brought into by other components.

<White Ink Production Example>

—Preparation of Titanium Dioxide Water Dispersion—

Highly pure water (30.8 g) and a dispersant (product name: DISPERBYK-190 available from Byk-Chemie Japan K.K.) (1.2 g) were put in a dispersion cup, and mildly stirred and homogenized. After this, titanium dioxide (product name: GTR-100 available from Sakai Chemical Industry Co., Ltd., with a primary particle diameter of 260 nm and a rutile crystal form, an organically treated product for water dispersion) (12.0 g) was added to the resultant, and the resultant was treated with an ultrasonic homogenizer (product name: US-300T available from NISSEI Corporation, with a tip diameter of 26) at 200 μA for 1 hour while being water-cooled, and then filtered through a cellulose acetate membrane filter having an average pore diameter of 5 μm (product name: MINISART 17594K available from Sartorius AG), to thereby obtain a titanium dioxide water dispersion having a solid content of 30% by mass and a volume average particle diameter ($D_{50}$) of 352 nm. The volume average particle diameter ($D_{50}$) was measured with a granularity distribution measuring instrument (product name: MICROTRAC UPA available from Nikkiso Co., Ltd.).

—Preparation of Urethane Resin Particles—
——Preparation 1 of Urethane Resin Particle Preparations——
Polycarbonate diol (1,500 g), which was a reaction product of 1,6-hexanediol and dimethyl carbonate, 2,2-dimethylol propionic acid (DMPA) (220 g), and N-methyl pyrrolidone (NMP) (1,347 g) were put under a nitrogen stream into a reaction vessel into which a stirrer, a reflux cooling tube, and a thermometer were inserted, and heated to 60° C., to thereby dissolve the 2,2-dimethylol propionic acid.

Next, 4,4'-dicyclohexyl methane diisocyanate (1,445 g) and dibutyl tin dilaurate (catalyst) (2.6 g) were added to the resultant, and the resultant was heated up to 90° C. and let to undergo a urethanation reaction for 5 hours, to thereby obtain an isocyanate-terminated urethane polymer solution 1.

Next, the isocyanate-terminated urethane polymer solution 1 was cooled to 80° C., and triethyl amine (149 g) was added and mixed with the resultant. The resulting mixture was extracted in an amount of 4,340 g, which was added to a mixture solution of water (5,400 g) and triethyl amine (15 g) while being strongly stirred.

Next, ice (1,500 g) and a 35% by mass 2-methyl-1,5-pentane diamine aqueous solution (626 g) were added to the resultant, and the resultant was let to undergo a chain elongation reaction. A solvent was distilled away from the resultant until the solid content concentration became 30% by mass, to thereby obtain a urethane resin particle dispersion liquid A.

——Preparation 2 of Urethane Resin Particles——
Polycarbonate diol (1,500 g), which was a reaction product of 1,6-hexanediol and dimethyl carbonate, polyoxyethylene chain-containing diol (product name: DHD1000S available from Mitsui Chemicals, Inc.) (254 g), and acetone (600 g) were put under a nitrogen stream into a reaction vessel into which a stirrer, a reflux cooling tube, and a thermometer were inserted, and mixed and dissolved.

Next, 4,4'-dicyclohexyl methane diisocyanate (390 g) and stannous octylate (catalyst) (0.7 g) were added to the resultant, and the resultant was heated up to 55° C. and let to undergo a urethanation reaction for 5 hours, to thereby obtain an isocyanate-terminated urethane polymer solution 2.

Next, acetone (860 g) was added and mixed with the isocyanate-terminated urethane polymer solution 2, and the resultant was cooled to 30° C.

Next, ion-exchanged water (4,000 g) was slowly added to the resultant, to thereby obtain a prepolymer water dispersion.

Next, a 35% by mass 2-methyl-1,5-pentane diamine aqueous solution (148 g) was added to the prepolymer water dispersion to let the prepolymer undergo a chain elongation reaction. After this, the amount of water in the resultant was adjusted to distil away the acetone until the solid content concentration became 30% by mass, to thereby obtain a urethane resin particle dispersion liquid B.

Example 1

—Preparation of White Ink—
3-methyl-1,3-butanediol (with a boiling point of 203° C.) (29% by mass), 2-pyrrolidone (with a boiling point of 245° C.) (1% by mass), diethylene glycol-n-butyl ether (with a boiling point of 231° C.) (1% by mass), a fluorosurfactant (product name: FS-300 available from Du Pont Kabushiki Kaisha, including 40% by mass of active constituent) (0.25% by mass), a defoamant (product name: ENVIROGEM AD01 available from Air Products and Chemicals, Inc.) (0.5% by mass), an antibacterial agent (component name: 1,2-benzothiazolin-3-one, product name: PROXEL GXL available from Arch Chemicals Japan, Inc.) (0.05% by mass), and an ion-exchanged water (balance) were added to a beaker, and stirred with a stirrer for 15 minutes and mixed uniformly, to thereby obtain a mixture liquid. Next, the urethane resin particle dispersion liquid A (with a solid content concentration of 30% by mass and 11% by mass of N-methyl-2-pyrrolidone (with a boiling point of 202° C.)) (33% by mass) was added to the mixture liquid, and the resultant was stirred for 15 minutes. After this, a cross-linked styrene-acrylic resin A (product name: ROPAQUE ULTRA E available from Rohm and Haas Company, including 30% by mass of active constituent) (30% by mass) was added as hollow resin particles to the resultant, and the resultant was stirred for 30 minutes. After this, the resultant was subjected to pressure filtration through a cellulose acetate membrane filter having a pore diameter of 5 μm (product name: MINISART 17594K available from Sartorius AG) to remove coarse particles. In this way, a white ink of Example 1 was produced. The glass transition temperature of the hollow resin particles was measured by drying the hollow resin particles for 30 minutes by raising the temperature from normal temperature to 200° C. under a nitrogen atmosphere, cooling the resulting hollow resin particles, and then raising the temperature from normal temperature to 200° C. at a rate of 5° C./min with a differential scanning calorimeter (DSC).

Examples 2 to 12 and Comparative Examples 1 to 6

The white inks of Examples 2 to 12 and Comparative Examples 1 to 6 were produced in the same manner as in Example 1, except that the composition and contents were changed to the composition and contents presented in Table 1 to Table 3. Table 1 to Table 3 present the composition and contents of Examples 1 to 12 and Comparative Examples 1 to 6.

TABLE 1

|  |  |  | Examples | | | | | |
|  |  |  | 1 | 2 | 3 | 4 | 5 | 6 |
|---|---|---|---|---|---|---|---|---|
|  |  | White ink No. | 1 | 2 | 3 | 4 | 5 | 6 |
| Colorant | Hollow resin particles | Cross-linked styrene-acrylic resin A*[1] (Tg: 106° C.) | 9 | — | — | — | 9 | 9 |
|  |  | Cross-linked styrene-acrylic resin B*[2] (Tg: 111° C.) | — | 9 | — | — | — | — |
|  |  | Cross-linked styrene-acrylic resin C*[3] (Tg: 109° C.) | — | — | 8.93 | — | — | — |
|  |  | Modified styrene-acrylic resin*[4] (Tg: 103° C.) | — | — | — | 9.01 | — | — |
|  |  | Titanium dioxide water dispersion | — | — | — | — | — | — |

TABLE 1-continued

|  |  |  | Examples | | | | | |
| --- | --- | --- | --- | --- | --- | --- | --- | --- |
|  |  |  | 1 | 2 | 3 | 4 | 5 | 6 |
| Water-soluble organic solvent | Diol having side-chain hydroxyl group and boiling point of 240° C. or lower | 1,2-butanediol (boiling point: 194° C.) | — | — | 28 | — | — | — |
|  |  | 1,3-butanediol (boiling point: 203° C.) | — | — | — | — | — | — |
|  |  | 2,3-butanediol (boiling point: 183° C.) | — | — | — | — | — | — |
|  |  | 3-methyl-1,3-butanediol (boiling point: 203° C.) | 29 | — | — | — | — | 29 |
|  |  | 2-methyl-2,4-pentanediol (boiling point: 197° C.) | — | 36 | — | — | — | — |
|  | Monohydric alcohol having boiling point of 240° C. or lower | Ethanol (boiling point: 78.37° C.) | — | — | — | 40 | — | — |
|  |  | 2-propanol (boiling point: 82.6° C.) | — | — | — | — | 35 | — |
|  | Straight-chain alkane diol having boiling point of 240° C. or lower | 1,4-butanediol (boiling point: 230° C.) | — | — | 1 | 4 | — | — |
|  |  | 1,5-pentanediol (boiling point: 239° C.) | — | — | — | — | 3 | — |
|  |  | 1,6-hexanediol (boiling point: 208° C.) | — | 3 | — | — | — | — |
|  | Water-soluble organic solvent having boiling point higher than 240° C. | Glycerin (boiling point: 290° C.) | — | — | — | — | — | — |
|  |  | 3-methyl-1,5-pentanediol (boiling point: 249° C.) | — | — | — | — | — | 3 |
|  |  | 2-pyrrolidone (boiling point: 245° C.) | 1 | 2 | 3 | 2 | 2 | 1 |
|  | Ether alcohol compound | Diethylene glycol-n-butyl ether (boiling point: 231° C.) | 1 | 1 | 1 | 1 | 1 | 1 |
| Common components | Film forming resin particles | Urethane resin particle dispersion liquid A (solid content: 30% by mass, 11% by mass of N-methyl-2-pyrrolidone (boiling point: 202° C.)) | 10 | 10 | 10 | 10 | 10 | 10 |
|  |  | Urethane resin particle dispersion liquid B (solid content: 30% by mass) | — | — | — | — | — | — |
|  | Surfactant | Fluorosurfactane*[5] | 0.1 | 0.1 | 0.1 | 0.1 | 0.1 | 0.1 |
|  | Defoamant | ENVIROGEM AD01*[6] | 0.5 | 0.5 | 0.5 | 0.5 | 0.5 | 0.5 |
|  | Antibacterial agent | 1,2-benzothiazolin-3-one*[7] | 0.05 | 0.05 | 0.05 | 0.05 | 0.05 | 0.05 |
|  |  | Ion-exchanged water | Balance | Balance | Balance | Balance | Balance | Balance |
|  |  | Total (% by mass) | 100 | 100 | 100 | 100 | 100 | 100 |
| Content (% by mass) of diol having side-chain hydroxyl group and boiling point of 240° C. or lower and monohydric alcohol having boiling point of 240° C. or lower relative to total amount of water-soluble organic solvent | | | 89 | 82.6 | 80.9 | 82.3 | 82.2 | 81.5 |
| Content (% by mass) of water-soluble organic solvent having boiling point higher than 240° C. relative to total amount of water-soluble organic solvent | | | 3.1 | 4.6 | 8.7 | 4.1 | 4.7 | 11.2 |

TABLE 2

|  |  |  | Examples | | | | | |
| --- | --- | --- | --- | --- | --- | --- | --- | --- |
|  |  |  | 7 | 8 | 9 | 10 | 11 | 12 |
|  |  | White ink No. | 7 | 8 | 9 | 10 | 11 | 12 |
| Colorant | Hollow resin particles | Cross-linked styrene-acrylic resin A*[1] (Tg: 106° C.) | — | — | — | — | 9 | — |
|  |  | Cross-linked styrene-acrylic resin B*[2] (Tg: 111° C.) | 9 | — | 9 | — | — | 9 |
|  |  | Cross-linked styrene-acrylic resin C*[3] (Tg: 109° C.) | — | 8.12 | — | 8.93 | — | — |
|  |  | Modified styrene-acrylic resin*[4] (Tg: 103° C.) | — | — | — | — | — | — |
|  |  | Titanium dioxide water dispersion | — | — | — | — | — | — |
| Water-soluble organic solvent | Diol having side-chain hydroxyl group and boiling point of 240° C. or lower | 1,2-butanediol (boiling point: 194° C.) | — | — | 10 | 28 | — | — |
|  |  | 1,3-butanediol (boiling point: 203° C.) | — | — | 25 | — | — | — |
|  |  | 2,3-butanediol (boiling point: 183° C.) | — | 20 | — | — | — | — |
|  |  | 3-methyl-1,3-butanediol (boiling point: 203° C.) | — | 20 | — | — | 29 | — |
|  |  | 2-methyl-2,4-pentanediol (boiling point: 197° C.) | 40 | — | — | — | — | 28 |
|  | Monohydric alcohol having boiling point of 240° C. or lower | Ethanol (boiling point: 78.37° C.) | — | — | — | — | — | — |
|  |  | 2-propanol (boiling point: 82.6° C.) | — | — | — | — | — | — |
|  | Straight-chain alkane diol having boiling point of 240° C. or lower | 1,4-butanediol (boiling point: 230° C.) | 2 | — | — | 1 | — | — |
|  |  | 1,5-pentanediol (boiling point: 239° C.) | — | — | — | — | — | — |
|  |  | 1,6-hexanediol (boiling point: 208° C.) | — | — | — | — | — | — |

TABLE 2-continued

|  |  |  | Examples | | | | | |
| --- | --- | --- | --- | --- | --- | --- | --- | --- |
|  |  |  | 7 | 8 | 9 | 10 | 11 | 12 |
| | Water-soluble organic solvent having boiling point higher than 240° C. | Glycerin (boiling point: 290° C.) | 4 | 5 | — | — | — | 5 |
| | | 3-methyl-1,5-pentanediol (boiling point: 249° C.) | — | — | 5 | — | — | — |
| | | 2-pyrrolidone (boiling point: 245° C.) | 2 | 1 | 1 | 3 | 1 | 1 |
| | Ether alcohol compound | Diethylene glycol-n-butyl ether (boiling point: 231° C.) | 1 | 2 | 2 | 1 | 1 | 2 |
| Common components | Film forming resin particles | Urethane resin particle dispersion liquid A (solid content: 30% by mass, 11% by mass of N-methyl-2-pyrrolidone (boiling point: 202° C.)) | 10 | 10 | 10 | — | — | — |
| | | Urethane resin particle dispersion liquid B (solid content: 30% by mass) | — | — | — | 10 | 10 | 10 |
| | Surfactant | Fluorosurfactant*5 | 0.1 | 0.1 | 0.1 | 0.1 | 0.1 | 0.1 |
| | Defoamant | ENVIROGEM AD01*6 | 0.5 | 0.5 | 0.5 | 0.5 | 0.5 | 0.5 |
| | Antibacterial agent | 1,2-benzothiazolin-3-one*7 | 0.05 | 0.05 | 0.05 | 0.05 | 0.05 | 0.05 |
| | Ion-exchanged water | | Balance | Balance | Balance | Balance | Balance | Balance |
| | Total (% by mass) | | 100 | 100 | 100 | 100 | 100 | 100 |
| | Content (% by mass) of diol having side-chain hydroxyl group and boiling point of 240° C. or lower and monohydric alcohol having boiling point of 240° C. or lower relative to total amount of water-soluble organic solvent | | 79.1 | 80.6 | 78.5 | 83.6 | 92.1 | 76.7 |
| | Content (% by mass) of water-soluble organic solvent having boiling point higher than 240° C. relative to total amount of water-soluble organic solvent | | 11.9 | 12.1 | 13.5 | 9.0 | 3.2 | 16.4 |

TABLE 3

|  |  |  | Comparative Examples | | | | | |
| --- | --- | --- | --- | --- | --- | --- | --- | --- |
|  |  |  | 1 | 2 | 3 | 4 | 5 | 6 |
| | | White ink No. | 13 | 14 | 15 | 16 | 17 | 18 |
| Colorant | Hollow resin particles | Cross-linked styrene-acrylic resin A*1 (Tg: 106° C.) | 9 | — | — | — | 9 | — |
| | | Cross-linked styrene-acrylic resin B*2 (Tg: 111° C.) | — | 9 | — | — | — | — |
| | | Cross-linked styrene-acrylic resin C*3 (Tg: 109° C.) | — | — | 8.93 | — | — | — |
| | | Modified styrene-acrylic resin*4 (Tg: 103° C.) | — | — | — | 9.01 | — | — |
| | | Titanium dioxide water dispersion | — | — | — | — | — | 9 |
| Water-soluble organic solvent | Diol having side-chain hydroxyl group and boiling point of 240° C. or lower | 1,2-butanediol (boiling point: 194° C.) | — | — | — | — | — | 10 |
| | | 1,3-butanediol (boiling point: 203° C.) | — | — | 30 | — | — | — |
| | | 2,3-butanediol (boiling point: 183° C.) | 10 | — | — | — | 20 | — |
| | | 3-methyl-1,3-butanediol (boiling point: 203° C.) | — | — | — | — | — | 20 |
| | | 2-methyl-2,4-pentanediol (boiling point: 197° C.) | — | 28 | — | — | — | — |
| | Monohydric alcohol having boiling point of 240° C. or lower | Ethanol (boiling point: 78.37° C.) | — | — | — | — | — | — |
| | | 2-propanol (boiling point: 82.6° C.) | — | — | — | — | — | — |
| | Straight-chain alkane diol having boiling point of 240° C. or lower | 1,4-butanediol (boiling point: 230° C.) | — | — | — | 40 | 5 | — |
| | | 1,5-pentanediol (boiling point: 239° C.) | 25 | — | 8 | — | — | — |
| | | 1,6-hexanediol (boiling point: 208° C.) | — | — | — | — | — | — |
| | Water-soluble organic solvent having boiling point higher than 240° C. | Glycerin (boiling point: 290° C.) | 5 | — | — | — | — | — |
| | | 3-methyl-1,5-pentanediol (boiling point: 249° C.) | — | 5 | — | — | — | — |
| | | 2-pyrrolidone (boiling point: 245° C.) | 2 | 1 | 1 | 2 | 1 | 1 |
| | Ether alcohol compound | Diethylene glycol-n-butyl ether (boiling point: 231° C.) | 2 | 2 | 2 | 2 | 2 | 2 |
| Common components | Film forming resin particles | Urethane resin particle dispersion liquid A (solid content: 30% by mass, 11% by mass of N-methyl-2-pyrrolidone (boiling point: 202° C.)) | 10 | 10 | 10 | 10 | 10 | — |
| | | Urethane resin particle dispersion liquid B (solid content: 30% by mass) | — | — | — | — | — | 10 |

TABLE 3-continued

|  |  | Comparative Examples | | | | | |
|---|---|---|---|---|---|---|---|
|  |  | 1 | 2 | 3 | 4 | 5 | 6 |
| Surfactant | Fluorosurfactant*5 | 0.1 | 0.1 | 0.1 | 0.1 | 0.1 | 0.1 |
| Defoamant | ENVIROGEM AD01*6 | 0.5 | 0.5 | 0.5 | 0.5 | 0.5 | 0.5 |
| Antibacterial agent | 1,2-benzothiazolin-3-one*7 | 0.05 | 0.05 | 0.05 | 0.05 | 0.05 | 0.05 |
| | Ion-exchanged water | Balance | Balance | Balance | Balance | Balance | Balance |
| | Total (% by mass) | 100 | 100 | 100 | 100 | 100 | 100 |
| Content (% by mass) of diol having side-chain hydroxyl group and boiling point of 240° C. or lower and monohydric alcohol having boiling point of 240° C. or lower relative to total amount of water-soluble organic solvent | | 21.9 | 74.5 | 70.4 | 0 | 67.6 | 89.6 |
| Content (% by mass) of water-soluble organic solvent having boiling point higher than 240° C. relative to total amount of water-soluble organic solvent | | 15.4 | 16.0 | 2.3 | 4.4 | 3.4 | 3.0 |

The asterisks in Table 1 to Table 3 represent the followings.

*1: product name: ROPAQUE ULTRA E (available from Rohm and Haas Company, including 30% by mass of active constituent)

*2: product name: ROPAQUE ULTRA DUAL (available from Rohm and Haas Company, including 30% by mass of active constituent)

*3: product name: SX868B (available from JSR Corporation, including 20.3% by mass of active constituent)

*4: product name: NIPOL MH8101 (available from Zeon Corporation, including 26.5% by mass of active constituent)

*5: product name: FS-300 (available from Du Pont Kabushiki Kaisha)

*6: product name: ENVIROGEM AD01 (available from Air Products and Chemicals, Inc.)

*7: product name: PROXEL GXL (available from Arch Chemicals Japan, Inc.)

Next, the following evaluation was performed using the produced white inks 1 to 18.

Examples 13 to 39 and Comparative Examples 7 to 21

—Degree of Whiteness of White Image—

A film of the produced white inks 1 to 9 and white inks 13 to 17 was formed over a transparent polyethylene terephthalate (PET) film using a doctor blade (available from Toyo Seiki Seisaku-Sho, Ltd., with a wet film thickness of 25 μm), heated at the heating temperature presented in Table 4 for 600 seconds, and then dried at the drying temperature presented in Table 4 for 1,800 seconds using a natural convection mode of a dryer (product name: MULTIOVEN MOV-300S available from AS ONE Corporation), to thereby obtain a white ink coating film.

After this, the degree of whiteness of the white image was evaluated according to the evaluation criteria below, based on the difference of the degree of whiteness (luminosity: $L_2^*$) of the white image made of the coating film dried at the heating temperature and drying temperature presented in Table 4 from a degree of whiteness (luminosity: $L_1^*$) of a white image formed at room temperature (25° C.) and dried sufficiently at room temperature (25° C.) for 4 days (the difference $\Delta L^*$=(luminosity: $L_1^*$ after forming at room temperature and drying at room temperature)−(luminosity: $L_2^*$ after heating and drying presented in Table 4)). The results are presented in Table 4. The luminosity was measured from the printed portion with a spectroscopic colorimetric densitometer (product name: X-RITE 939 available from X-Rite, Incorporated) in a state that the recorded PET film was backed with a commercially available black sheet of paper.

[Evaluation Criteria]

A: $\Delta L^*$ was less than 5.

B: $\Delta L^*$ was 5 or greater but less than 10.

C: $\Delta L^*$ was 10 or greater.

TABLE 4

|  | White ink No. | Heating temperature (° C.) | Drying temperature (° C.) | Evaluation result Degree of whiteness |
|---|---|---|---|---|
| Examples | 13 | 1 | 25 | 50 | A |
| | 14 | 1 | 25 | 70 | A |
| | 15 | 1 | 70 | 70 | A |
| | 16 | 2 | 25 | 50 | A |
| | 17 | 2 | 25 | 70 | A |
| | 18 | 2 | 70 | 70 | A |
| | 19 | 3 | 25 | 50 | A |
| | 20 | 3 | 25 | 70 | A |
| | 21 | 3 | 70 | 70 | A |
| | 22 | 4 | 25 | 50 | A |
| | 23 | 4 | 25 | 70 | A |
| | 24 | 4 | 70 | 70 | B |
| | 25 | 5 | 25 | 50 | A |
| | 26 | 5 | 25 | 70 | A |
| | 27 | 5 | 70 | 70 | B |
| | 28 | 6 | 25 | 50 | A |
| | 29 | 6 | 25 | 70 | A |
| | 30 | 6 | 70 | 70 | A |
| | 31 | 7 | 25 | 50 | A |
| | 32 | 7 | 25 | 70 | A |
| | 33 | 7 | 70 | 70 | A |
| | 34 | 8 | 25 | 50 | A |
| | 35 | 8 | 25 | 70 | A |
| | 36 | 8 | 70 | 70 | B |
| | 37 | 9 | 25 | 50 | A |
| | 38 | 9 | 25 | 70 | B |
| | 39 | 9 | 70 | 70 | B |
| Comparative Examples | 7 | 13 | 25 | 50 | B |
| | 8 | 13 | 25 | 70 | C |
| | 9 | 13 | 70 | 70 | C |
| | 10 | 14 | 25 | 50 | B |
| | 11 | 14 | 25 | 70 | B |
| | 12 | 14 | 70 | 70 | C |
| | 13 | 15 | 25 | 50 | B |
| | 14 | 15 | 25 | 70 | C |
| | 15 | 15 | 70 | 70 | C |
| | 16 | 16 | 25 | 50 | B |
| | 17 | 16 | 25 | 70 | C |
| | 18 | 16 | 70 | 70 | C |
| | 19 | 17 | 25 | 50 | B |
| | 20 | 17 | 25 | 70 | C |
| | 21 | 17 | 70 | 70 | C |

It can be seen that in Examples 13 to 39 in which the white ink of the present invention was dried at the heating and drying temperatures presented in Table 4, the hollow resin particles, which were the colorant, suppressed reduction in the degree of whiteness of the white image after heated and dried. It can be seen that reduction in the degree of whiteness of the white image in Comparative Examples 7 to 21 due to heating during film formation and drying was greater than the reduction in the degree of whiteness of the white image in Examples 13 to 39. This was considered to be because the hollow resin particles softened due to the water-soluble organic solvents and collapsed without being able to maintain the hollow structure, thus making it harder for light scattering to occur.

Examples 40 to 48 and Comparative Examples 22 to 26

—Degree of Whiteness of White Image by Inkjet Recording Method—

An inkjet printer (product name: IPSIO GXE3300 available from Ricoh Company, Ltd.) from which an exterior package was removed to attach a multi manual feeder on the rear was washed by passing pure water through an ink supplying path including the inkjet heads. The pure water was passed through the ink supplying path sufficiently until the washing liquid discharged was no longer colored. Next, the washing liquid was discharged from the apparatus, and the apparatus was used as an inkjet recording apparatus for evaluation. The white inks 1 to 9 and the white inks 13 to 17 were deaerated of a gas by stirring under reduced pressure of from 5 Pa to 10 Pa for 30 minutes. After this, an ink cartridge was filled with the white inks, and used as an ink cartridge for evaluation. The inkjet printer was controlled to perform a filling operation, and it was confirmed that all nozzles were filled with the white ink and no abnormal image was output. The inkjet printer was set to a gloss paper clean mode using a printer-attached driver, and then set to color matching off as a printing mode by user setting. The jetting amount was adjusted by changing the driving voltage of the inkjet heads such that the accumulation amount of the white ink for a solid image over a recording medium would be 20 g/m$^2$ in the set printing mode.

A transparent PET film (product name: ESTER FILM E5100 available from Toyobo Co., Ltd.) secured over PPC regular paper (product name: MY PAPER available from Ricoh Company, Ltd.) with a double-face tape was fed into the multi manual feeder on the rear, and a solid image with a size of 50 mm×50 mm produced with MICROSOFT WORD 2003 was recorded over the transparent PET film by inkjet.

After this, the degree of whiteness of the white image was evaluated according to the evaluation criteria below, based on the difference of the degree of whiteness (luminosity: $L_2^*$) of the white image made of the coating film heated and dried by being put in a thermostat bath of 70° C. for 30 minutes immediately after the printing from a degree of whiteness (luminosity: $L_1^*$) of a white image formed at room temperature (25° C.) and dried sufficiently at room temperature (25° C.) for 4 days (the difference $\Delta L^*=(L_1^*$ after forming at room temperature and drying at room temperature)$-(L_2^*$ after heating and drying presented in Table 5)). The luminosity was measured from the printed portion with a spectroscopic colorimetric densitometer (product name: X-RITE 939 available from X-Rite, Incorporated) in a state that the printed PET film was backed with a commercially available black sheet of paper. The results are presented in Table 5.

[Evaluation Criteria]
A: The $\Delta L^*$ value was less than 5.
B: The $\Delta L^*$ value was 5 or greater but less than 10.
C: The $\Delta L^*$ value was 10 or greater.

——Drying Property of White Ink——

A drying property of the white ink was evaluated according to the evaluation criteria below, by scrubbing the coating film surface after the drying with a finger ball and confirming a peeling state.

[Evaluation Criteria]
A: The coating film was not peeled.
B: The coating film was partially peeled, and the white ink transferred to the finger.
C: The coating film was peeled and disappeared.

——Jetting Stability——

After jetting conditions were examined, the head nozzle surfaces were capped for protection and left for 2 weeks. After the leaving for 2 weeks, jetting conditions during jetting operations were examined, and jetting stability of the white inks was evaluated according to the evaluation criteria below.

[Evaluation Criteria]
A: The white ink was jetted from all nozzles safely.
B: There were nozzles from which the white ink could not be jetted, but these nozzles could be recovered by a maintaining/recovering operation.
C: There were nozzles from which the white ink could not be jetted, and these nozzles could not be recovered by a maintaining/recovering operation.

TABLE 5

|  |  | White ink No | Heating temperature (° C.) | Degree of whiteness | Drying property | Jetting stability |
|---|---|---|---|---|---|---|
| Examples | 40 | 1 | 70 | A | A | B |
|  | 41 | 2 | 70 | A | A | B |
|  | 42 | 3 | 70 | A | A | A |
|  | 43 | 4 | 70 | A | A | C |
|  | 44 | 5 | 70 | A | A | C |
|  | 45 | 6 | 70 | B | B | B |
|  | 46 | 7 | 70 | B | B | B |
|  | 47 | 8 | 70 | A | B | A |
|  | 48 | 9 | 70 | A | B | A |
| Comparative Examples | 22 | 13 | 70 | C | B | A |
|  | 23 | 14 | 70 | C | B | B |
|  | 24 | 15 | 70 | C | A | A |
|  | 25 | 16 | 70 | C | A | A |
|  | 26 | 17 | 70 | C | A | B |

From the results of Table 5, it was revealed that also in the white image formed by inkjet recording, the white ink of the present invention heated and dried after the inkjet recording had a degree of whiteness equal or similar to a degree of whiteness by drying at room temperature.

<Ink Set Production Example>
—Pigment Dispersion Liquid Preparation—
——Preparation Example 1 of Cyan Pigment Dispersion Liquid——

A cyan pigment (Pigment Blue 15:3, product name: LIONOL BLUE FG-7351 available from Toyo Ink Co., Ltd.) (15 parts), an anionic surfactant (product name: PIONIN A-51-B available from Takemoto Oil & Fat Co., Ltd.) (2 parts), and ion-exchanged water (83 parts) were mixed, and then cyclically dispersed for 7 hours with a disk-type bead mill (KDL TYPE available from Shinmaru Enterprises Corporation, media: zirconia balls with a diameter of 0.3 mm), to thereby obtain a cyan pigment dispersion liquid (with a total solid content of 17% by mass and a pigment solid content of 15% by mass).

———Preparation Example 2 of Magenta Pigment Dispersion Liquid———

A magenta pigment dispersion liquid (with a total solid content of 17% by mass and a pigment solid content of 15% by mass) was produced in the same manner as in the cyan pigment dispersion liquid preparation example 1, except that the cyan pigment was changed to a magenta pigment (Pigment Red 122, product name: TONER MAGENTA E002 available from Clariant Japan K.K.).

———Preparation Example 3 of Yellow Pigment Dispersion Liquid———

A yellow pigment dispersion liquid (with a total solid content of 17% by mass and a pigment solid content of 15% by mass) was produced in the same manner as in the cyan pigment dispersion liquid preparation example 1, except that the cyan pigment was changed to a yellow pigment (Pigment Yellow 74, product name: FAST YELLOW 531 available from Dainichiseika Color & Chemicals Mfg. Co., Ltd.).

———Preparation Example 4 of Black Pigment Dispersion Liquid———

A black pigment dispersion liquid (with a total solid content of 17% by mass and a pigment solid content of 15% by mass) was produced in the same manner as in the cyan pigment dispersion liquid preparation example 1, except that the cyan pigment was changed to a black pigment (carbon black, product name: BLACK PEARLS 1000 available from Cabot Corporation).

———Preparation of Color Ink and Ink Free of Hollow Resin Particles———

———Preparation Example 1 of Cyan Ink (Cy-1)———

The cyan pigment dispersion liquid (20 parts), an aqueous polyurethane resin particle dispersion liquid with a solid content of 25% by mass (product name: HYDRAN HW-340 with an average particle diameter of 35 nm, available from DIC Corporation) (24 parts), a fluorosurfactant (product name: FS-300 available from Du Pont Kabushiki Kaisha) (2 parts), 1,4-butanediol (12 parts), 1,2-propanediol (10 parts), diethylene glycol-n-butyl ether (10 parts), glycerin (8 parts), ENVIRONGEM AD01 (available from Air Products and Chemicals, Inc.) (0.5 parts), ion-exchanged water (balance), and PROXEL GXL (available from Arch Chemicals Japan, Inc.) (0.1 parts) were mixed and stirred, and then filtered through a 0.2 μm polypropylene filter, to thereby obtain a cyan ink.

Preparation Examples 2 to 11 of Cyan Ink (Cy-2), Magenta Inks (Ma-1, Ma-2, Ma-3, and Ma-4), Yellow Inks (Ye-1, Ye-2, and Ye-3), and Black Inks (Bk-1 and Bk-2)

A cyan ink (Cy-2), magenta inks (Ma-1, Ma-2, Ma-3, and Ma-4), yellow inks (Ye-1, Ye-2, and Ye-3), and black inks (Bk-1 and Bk-2) were produced in the same manner as in the preparation example 1 of the cyan ink (Cy-1), except that the composition and contents were changed to the composition and contents presented in Table 6 and Table 7.

Table 6 and Table 7 present the preparation examples 1 to 11 of the cyan inks (Cy-1 and Cy-2), the magenta inks (Ma-1, Ma-2, Ma-3, and Ma-4), the yellow inks (Ye-1, Ye-2, and Ye-3), and the black inks (Bk-1 and Bk-2).

TABLE 6

| | | | Preparation Examples | | | | | |
|---|---|---|---|---|---|---|---|---|
| | | | 1 | 2 | 3 | 4 | 5 | 6 |
| | Color ink and ink free of hollow resin particles | | Cy-1 | Ma-1 | Ye-1 | Bk-1 | Cy-2 | Ma-2 |
| Colorant | Pigment | Cyan pigment dispersion liquid | 20 | — | — | — | 20 | — |
| | | Magenta pigment dispersion liquid | — | 20 | — | — | — | 20 |
| | | Yellow pigment dispersion liquid | — | — | 20 | — | — | — |
| | | Black pigment dispersion liquid | — | — | — | 20 | — | — |
| Water-soluble organic solvent | Diol having side-chain hydroxyl group and boiling point of 240° C. or lower | 1,2-butanediol (boiling point: 194° C.) | — | — | — | — | 28 | — |
| | | 2,3-butanediol (boiling point: 183° C.) | — | — | — | 8 | — | — |
| | | 1,2-propanediol (boiling point: 188° C.) | 10 | — | 5 | — | — | — |
| | | 2-methyl-2,4-pentanediol (boiling point: 197° C.) | — | — | — | — | — | — |
| | | 3-methyl-1,3-butanediol (boiling point: 203° C.) | — | — | — | — | — | 29 |
| | Monohydric alcohol having boiling point of 240° C. or lower | 3-methoxy-3-methyl-1-butanol (boiling point 175° C.) | — | — | — | — | — | — |
| | Straight-chain alkane diol having boiling point of 240° C. or lower | 1,4-butanediol (boiling point: 230° C.) | 12 | — | 20 | — | 1 | — |
| | | 1,5-pentanediol (boiling point: 239° C.) | — | — | — | 17 | — | — |
| | | 1,6-hexanediol (boiling point: 208° C.) | — | 15 | — | — | — | — |
| | Water-soluble organic solvent having boiling point higher than 240° C. | Glycerin (boiling point: 290° C.) | 8 | 5 | — | — | — | — |
| | | 3-methyl-1,5-pentanediol (boiling point: 249° C.) | — | — | 5 | 3 | — | — |
| | | 2-pyrrolidone (boiling point: 245° C.) | — | — | — | — | 3 | 1 |
| | Ether alcohol compound | Diethylene glycol | — | 10 | — | — | — | — |
| | | Diethylene glycol-n-butyl ether (boiling point: 231° C.) | 10 | 10 | 10 | — | 1 | 1 |
| | | Diethylene glycol diethyl ether | — | — | — | 12 | — | — |

TABLE 6-continued

|  |  |  | Preparation Examples | | | | | |
|---|---|---|---|---|---|---|---|---|
|  |  |  | 1 | 2 | 3 | 4 | 5 | 6 |
| Common components | Film forming resin particles | Urethane resin particle dispersion liquid A (solid content: 30% by mass, 11% by mass of N-methyl-2-pyrrolidone (boiling point: 202° C.)) | — | — | — | — | 15 | — |
|  |  | Urethane resin particle emulsion (solid content: 25%)*8 | 24 | 24 | 24 | 24 | — | 20 |
|  | Surfactant | Fluorosurfactant*5 | 2 | 2 | 2 | 2 | 0.1 | 0.1 |
|  | Defoamant | ENVIROGEM AD01*6 | 0.5 | 0.5 | 0.5 | 0.5 | 0.5 | 0.5 |
|  | Antibacterial agent | 1,2-benzothiazolin-3-one*7 | 0.1 | 0.1 | 0.1 | 0.1 | 0.1 | 0.1 |
|  |  | Ion-exchanged water | Balance | Balance | Balance | Balance | Balance | Balance |
|  |  | Total (% by mass) | 100 | 100 | 100 | 100 | 100 | 100 |
| Content (% by mass) of diol having side-chain hydroxyl group and boiling point of 240° C. or lower and monohydric alcohol having boiling point of 240° C. or lower relative to total amount of water-soluble organic solvent | | | 24.3 | 0 | 12.2 | 19.5 | 82.1 | 90.3 |

TABLE 7

|  |  |  | Preparation Examples | | | | |
|---|---|---|---|---|---|---|---|
|  |  |  | 7 | 8 | 9 | 10 | 11 |
|  |  | Color ink and ink free of hollow resin particles | Ye-2 | Bk-2 | Ma-3 | Ma-4 | Ye-3 |
| Colorant | Pigment | Cyan pigment dispersion liquid | — | — | — | — | — |
|  |  | Magenta pigment dispersion liquid | — | — | 20 | 20 | — |
|  |  | Yellow pigment dispersion liquid | 20 | — | — | — | 20 |
|  |  | Black pigment dispersion liquid | — | 20 | — | — | — |
| Water-soluble organic solvent | Diol having side-chain hydroxyl group and boiling point of 240° C. or lower | 1,2-butanediol (boiling point: 194° C.) | 10 | — | — | — | — |
|  |  | 2,3-butanediol (boiling point: 183° C.) | — | 15 | — | — | — |
|  |  | 1,2-propanediol (boiling point: 188° C.) | — | — | — | 10 | — |
|  |  | 2-methyl-2,4-pentanediol (boiling point 197° C.) | — | — | — | — | 28 |
|  |  | 3-methyl-1,3-butanediol (boiling point: 203° C.) | 20 | 15 | — | 5 | — |
|  | Monohydric alcohol having boiling point of 240° C. or lower | 3-methoxy-3-methyl-1-butanol (boiling point: 175° C.) | 2 | — | — | — | — |
|  | Straight-chain alkane diol having boiling point of 240° C. or lower | 1,4-butanediol (boiling point: 230° C.) | — | 1 | — | 15 | — |
|  |  | 1,5-pentanediol (boiling point: 239° C.) | — | — | 6 | — | — |
|  |  | 1,6-hexanediol (boiling point: 208° C.) | — | — | 12 | — | — |
|  | Water-soluble organic solvent having boiling point higher than 240° C. | Glycerin (boiling point: 290° C.) | — | — | — | — | 5 |
|  |  | 3-methyl-1,5-pentanediol (boiling point: 249° C.) | — | — | — | — | — |
|  |  | 2-pyrrolidone (boiling point: 245° C.) | 1 | 3 | 2 | — | 1 |
|  | Ether alcohol compound | Diethylene glycol | — | — | 10 | — | — |
|  |  | Diethylene glycol-n-butyl ether (boiling point: 231° C.) | — | 1 | 10 | 10 | 2 |
|  |  | Diethylene glycol diethyl ether | — | — | — | — | — |
| Common components | Film forming resin particles | Urethane resin particle dispersion liquid A (solid content: 30% by mass, 11% by mass of N-methyl-2-pyrrolidone (boiling point: 202° C.)) | — | 15 | — | 15 | 15 |
|  |  | Urethane resin particle emulsion (solid content: 25%)*3 | 20 | — | 24 | — | — |
|  | Surfactant | Fluorosurfactone*5 | 0.1 | 0.1 | 2 | 0.1 | 0.1 |
|  | Defoamant | ENVIROGEM AD01*6 | 0.5 | 0.5 | 0.5 | 0.5 | 0.5 |
|  | Antibacterial agent | 1,2-benzothiazolin-3-one*7 | 0.1 | 0.1 | 0.1 | 0.1 | 0.05 |
|  |  | Ion-exchanged water | Balance | Balance | Balance | Balance | Balance |
|  |  | Total (% by mass) | 100 | 100 | 100 | 100 | 100 |
| Content (% by mass) of diol having side-chain hydroxyl group and boiling point of 240° C. or lower and monohydric alcohol having boiling point of 240° C. or lower relative to total amount of water-soluble organic solvent | | | 88 | 83.1 | 0 | 36.5 | 75.5 |

The asterisks in Table 6 and Table 7 represent the followings.

*5: product name: FS-300 (available from Du Pont Kabushiki Kaisha)
*6: product name: ENVIROGEM AD01 (available from Air Products and Chemicals, Inc.)
*7: product name: PROXEL GXL (available from Arch Chemicals Japan, Inc.)
*8: product name: HYDRAN HW-340 (available from DIC Corporation)

—Ink Set Including White Ink and Color Ink—

Example 49

An ink set including the white ink 1 produced in Example 1 and the cyan ink (Cy-1) produced in Preparation Example 1 was produced.

Examples 50 to 84 and Comparative Examples 27 to 50

Ink sets were produced in the same manner as in Example 49, except that the white ink 1 and the cyan ink (Cy-1) were changed to the white inks and the color inks presented in Table 8 to Table 14. Table 8 to Table 14 present the ink sets of Examples 49 to 84 and Comparative Examples 27 to 50.

Next, the following evaluation was performed using the produced ink sets of Examples 49 to 84 and Comparative Examples 27 to 50.

——Degree of Whiteness of White Image——

An inkjet printer (product name: IPSIO GXE3300 available from Ricoh Company, Ltd.) from which an exterior package was removed to attach a multi manual feeder on the rear was washed by passing pure water through an ink supplying path including the inkjet heads. The pure water was passed through the ink supplying path sufficiently until the washing liquid discharged was no longer colored. Next, the washing liquid was discharged from the apparatus, and the apparatus was used as an inkjet recording apparatus for evaluation. The inks of each ink set were deaerated of a gas by stirring under reduced pressure of from 5 Pa to 10 Pa for 30 minutes. After this, ink cartridges were filled with the inks, and used as ink cartridges for evaluation. The inkjet printer was controlled to perform a filling operation, and it was confirmed that all nozzles were filled with the inks and no abnormal image was output. The inkjet printer was set to a gloss paper clean mode using a printer-attached driver, and then set to color matching off as a printing mode by user setting. The jetting amount was adjusted by changing the driving voltage of the inkjet heads such that the accumulation amount of the inks for a solid image over a recording medium would be 20 g/m$^2$ in the set printing mode.

A transparent PET film (product name: ESTER FILM E5100 available from Toyobo Co., Ltd.) secured over PPC regular paper (product name: MY PAPER available from Ricoh Company, Ltd.) with a double-face tape was fed into the multi manual feeder on the rear, and a single-color solid image with a size of 50 mm×50 mm produced with MICROSOFT WORD 2003 was recorded with the color ink over the transparent PET film by inkjet.

After this, the single-color solid image was dried in a thermostat bath of 70° C. for 30 minutes. After this, a solid image with a size of 50 mm×50 mm was recorded with the white ink over the single-color solid image made of the color ink, and dried in a thermostat bath of 70° C. for 30 minutes. The transparent PET film over which the solid images were recorded was backed with a commercially available black or white sheet of paper on the solid image recorded-side, and a hue of the recorded portion was measured from the PET film-side with a spectroscopic colorimetric densitometer (product name: X-RITE 939 available from X-Rite, Incorporated). A difference in hue (ΔE) between when the background was the black sheet of paper and when the background was the white sheet of paper was calculated, and a degree of whiteness was evaluated according to the evaluation criteria below. The results are presented in Table 8 to Table 14.

—Evaluation Criteria—
A: ΔE was less than 5.
B: ΔE was 5 or greater but less than 10.
C: ΔE was 10 or greater.

TABLE 8

|  |  | Examples | | | | | | | | | |
|---|---|---|---|---|---|---|---|---|---|---|
|  |  | 49 | 50 | 51 | 52 | 53 | 54 | 55 | 56 | 57 | 58 |
| Ink set | White ink No. | 1 | 1 | 1 | 1 | 2 | 2 | 2 | 2 | 3 | 3 |
|  | Color ink | Cy-1 | Ma-1 | Ye-1 | Bk-1 | Cy-1 | Ma-1 | Ye-1 | Bk-1 | Cy-1 | Ma-1 |
| Evaluation result | Degree of whiteness | A | A | A | A | A | A | A | A | A | A |

TABLE 9

|  |  | Examples | | | | | | | | | |
|---|---|---|---|---|---|---|---|---|---|---|
|  |  | 59 | 60 | 61 | 62 | 63 | 64 | 65 | 66 | 67 | 68 |
| Ink set | White ink No. | 3 | 3 | 4 | 4 | 4 | 4 | 5 | 5 | 5 | 5 |
|  | Color ink | Ye-1 | Bk-1 | Cy-1 | Ma-1 | Ye-1 | Bk-1 | Cy-1 | Ma-1 | Ye-1 | Bk-1 |
| Evaluation result | Degree of whiteness | A | A | A | A | A | A | A | A | A | A |

TABLE 10

|  |  | Examples | | | | | | | | | |
|---|---|---|---|---|---|---|---|---|---|---|---|
|  |  | 69 | 70 | 71 | 72 | 73 | 74 | 75 | 76 | 77 | 78 |
| Ink set | White ink No. | 6 | 6 | 6 | 6 | 7 | 7 | 7 | 7 | 8 | 8 |
|  | Color ink | Cy-1 | Ma-1 | Ye-1 | Bk-1 | Cy-1 | Ma-1 | Ye-1 | Bk-1 | Cy-1 | Ma-1 |
| Evaluation result | Degree of whiteness | B | B | B | B | B | B | B | B | A | A |

TABLE 11

|  |  | Examples | | | | | |
|---|---|---|---|---|---|---|---|
|  |  | 79 | 80 | 81 | 82 | 83 | 84 |
| Ink set | White ink No. | 8 | 8 | 9 | 9 | 9 | 9 |
|  | Color ink | Ye-1 | Bk-1 | Cy-1 | Ma-1 | Ye-1 | Bk-1 |
| Evaluation result | Degree of whiteness | A | A | A | A | A | A |

TABLE 12

|  |  | Comparative Examples | | | | | | | | | |
|---|---|---|---|---|---|---|---|---|---|---|---|
|  |  | 27 | 28 | 29 | 30 | 31 | 32 | 33 | 34 | 35 | 36 |
| Ink set | White ink No. | 13 | 13 | 13 | 13 | 14 | 14 | 14 | 14 | 15 | 15 |
|  | Color ink | Cy-1 | Ma-1 | Ye-1 | Bk-1 | Cy-1 | Ma-1 | Ye-1 | Bk-1 | Cy-1 | Ma-1 |
| Evaluation result | Degree of whiteness | C | C | C | C | C | C | C | C | C | C |

TABLE 13

|  |  | Comparative Examples | | | | | | | | | |
|---|---|---|---|---|---|---|---|---|---|---|---|
|  |  | 37 | 38 | 39 | 40 | 41 | 42 | 43 | 44 | 45 | 46 |
| Ink set | White ink No. | 15 | 15 | 16 | 16 | 16 | 16 | 17 | 17 | 17 | 17 |
|  | Color ink | Ye-1 | Bk-1 | Cy-1 | Ma-1 | Ye-1 | Bk-1 | Cy-1 | Ma-1 | Ye-1 | Bk-1 |
| Evaluation result | Degree of whiteness | C | C | C | C | C | C | C | C | C | C |

TABLE 14

|  |  | Comparative Examples | | | |
|---|---|---|---|---|---|
|  |  | 47 | 48 | 49 | 50 |
| Ink set | White ink No. | 18 | 18 | 18 | 18 |
|  | Color ink | Cy-1 | Ma-1 | Ye-1 | Bk-1 |
| Evaluation result | Degree of whiteness | C | C | C | C |

From the results in Table 8 to Table 14, it was revealed that use of the white ink in the ink set of the present invention could save hue change in the recorded portion due to change in the background color, because the hollow resin particles, which was the colorant, could maintain the shape even after the heating/drying step after the recording, and could suppress reduction in the degree of whiteness of the white image.

—Ink Set Including White Ink and Ink Free of Hollow Resin Particles—

Example 85

An ink set including the white ink 10 produced in Example 10 and the cyan ink (Cy-2) free of hollow resin particles produced in Preparation Example 5 was produced.

Examples 86 to 89 and Comparative Examples 51 to 55

Ink sets were produced in the same manner as in Example 84, except that the white ink 10 and the cyan ink (Cy-2) were changed to the white inks and the inks free of hollow resin particles presented in Table 15 and Table 16. Table 15 and Table 16 present the ink sets of Examples 85 to 89 and Comparative Examples 51 to 55.

Next, the following evaluation was performed using the produced ink sets of Examples 85 to 89 and Comparative Examples 51 to 55.

——Drying Property and Degree of Coloring——

Evaluation was performed using an apparatus having the configuration of FIG. 3 including inkjet heads (product name: MH5440 available from Ricoh Company, Ltd.). The jetting amount was adjusted by changing the driving voltages of the heads such that a solid image to be recorded over inkjet matt coated paper at a resolution of 1,200 dpi×1,200 dpi would be coated with the white ink in an application amount of 30 g/m² and with the ink free of hollow resin particles in an application amount of 15 g/m². The evaluation was performed by increasing the accumulation amount up to 400% by recording images in an overlapping manner, where an accumulation amount over the solid image was regarded as 100%. A transparent PET film (product name: ESTER FILM E5100 available from Toyobo Co., Ltd.) secured over PPC regular paper (product name: MY PAPER available from Ricoh Company, Ltd.) with a double-face tape was used as a recording medium to be recorded. The driving frequency of the inkjet heads was changed such that an output image would be 1,200 dpi×1,200 dpi and the printing speed would be 0.15 mm/sec, to thereby adjust the recording speed.

The inkjet recording method illustrated in FIG. 7 was employed, and a solid image having a size of 50 mm×50 mm was recorded with the white ink using the nozzles at the longer-direction lower half of the recording head. After the recording, the recording medium was sent forth by an amount corresponding to the length of the longer-direction half of the inkjet head. Next, a solid image was recorded in the same manner as described above with the white ink using the lower half of the inkjet head, while at the same time, a solid image having a size of 50 mm×50 mm was recorded over the solid image formed of the white ink with the ink free of hollow resin particles using the nozzles at the longer-direction upper half of the inkjet head. Here, the recording was performed such that the white ink including hollow resin particles and the ink free of hollow resin particles would not land on the same position and adjacent positions in the same scan.

Next, heating/drying was performed at a hot air temperature of 70° C., at an air flow of the hot air of 10 m³/m²/sec, and for 15 minutes including the heating/drying time during the recording. Then, a "drying property" and a "degree of coloring" were evaluated according to the evaluation criteria below. A heating/drying temperature, which was a temperature to be set as the temperature at the film surface, was measured by bringing a mold surface sensor MF-O-K available from Toa Electric Co., Ltd. into contact with the film surface. The hot air temperature, which was a temperature of the air at the outlet of the hot air, was also measured in the same manner.

——Drying Property——

A "drying property" of the image was evaluated by scrubbing the image surface of the obtained image lightly with the ball of a forefinger and confirming a peeling state. The results are presented in Table 15 and Table 16.

——Evaluation Criteria——

A: The image was not peeled.
B: The image was partially peeled, and the inks transferred to the forefinger.
C: The image was peeled and disappeared.

——Degree of Coloring——

The transparent PET film over which the solid images were recorded was backed with a commercially available black or white sheet of paper on the solid image recorded-side, and a hue of the recorded portion was measured from the PET film-side with a spectroscopic colorimetric densitometer (product name: X-RITE 939 available from X-Rite, Incorporated). A difference in hue (ΔE) between when the background was the black sheet of paper and when the background was the white sheet of paper was calculated, and a degree of coloring was evaluated according to the evaluation criteria below. The results are presented in Table 15 and Table 16.

——Evaluation Criteria——

A: ΔE was less than 10.
B: ΔE was 10 or greater but less than 20.
C: ΔE was 20 or greater but less than 30.
D: ΔE was 30 or greater.

TABLE 15

|  |  | Examples | | | | |
|---|---|---|---|---|---|---|
|  |  | 85 | 86 | 87 | 88 | 89 |
| Ink set | White ink No. | 10 | 11 | 10 | 11 | 10 |
|  | Color ink free of hollow resin particles | Cy-2 | Cy-2 | Ma-2 | Ye-2 | Bk-2 |
| Accumulation amount (%) | White ink | 100 | 100 | 100 | 200 | 400 |
|  | Color ink free of hollow resin particles | 100 | 100 | 100 | 100 | 100 |

TABLE 15-continued

|  |  | Examples | | | | |
| --- | --- | --- | --- | --- | --- | --- |
|  |  | 85 | 86 | 87 | 88 | 89 |
| Drying temperature | Heating temperature (° C.) near the printing area | 55 | 75 | 40 | 65 | 55 |
| Evaluation result | Drying property | A | A | A | A | A |
|  | Degree of coloring | B | C | B | A | A |

TABLE 16

|  |  | Comparative Examples | | | | |
| --- | --- | --- | --- | --- | --- | --- |
|  |  | 51 | 52 | 53 | 54 | 55 |
| Ink set | White ink No. | 12 | 11 | 10 | 11 | 10 |
|  | Color ink free of hollow resin particles | Cy-2 | Cy-1 | Ma-3 | Ma-4 | Ye-3 |
| Accumulation amount (%) | White ink | 100 | 100 | 100 | 100 | 100 |
|  | Color ink free of hollow resin particles | 100 | 100 | 100 | 100 | 100 |
| Drying temperature | Heating temperature (° C.) near the printing area | 55 | 45 | 45 | 60 | 50 |
| Evaluation result | Drying property | C | C | B | B | C |
|  | Degree of coloring | D | D | D | D | D |

From the results in Table 15 and Table 16, it was revealed that color development of the ink free of hollow resin particles could be improved also when the white ink and the ink free of hollow resin particles were used.

Test Examples 1 to 6

Evaluation of Influence of Temperatures in First Heating Treatment and Second Heating Treatment The produced white ink 11 was evaluated in the manner described below using the inkjet recording apparatus illustrated in FIG. 3 described above and an inkjet head (product name: RICOH MH5440 available from Ricoh Company, Ltd.). The jetting amount of the white ink was adjusted by changing the driving voltage of the inkjet head such that a solid image to be recorded over inkjet matt coated paper (product name: SUPER FINE PAPER KA4250SFR available from Seiko Epson Corporation) at a resolution of 1,200 dpi×1,200 dpi would have the white ink in an accumulation amount of 60 g/m² including an overprinted amount. A transparent polyethylene terephthalate (PET) film (product name: ESTER FILM E5100 available from Toyobo Co., Ltd.) was used as a recording medium to be recorded. The driving frequency of the head was adjusted such that the recording speed would be 0.15 mm/sec. Recording was performed at the temperature in the first heating treatment presented in Table 17. After this, the white ink was dried by application of hot air at the temperature in the second heating treatment presented in Table 17, to there by obtain a recorded matter.

The temperature in the heating treatment, as the temperature to be set at the surface of the transparent PET film, was measured by bringing a mold surface sensor (product name: MF-O-K available from Toa Electric Co., Ltd.) into contact with the film surface. The hot air temperature, which was a temperature of the air at the outlet of the hot air, was also measured in the same manner. The second platen was set to be heated to the same temperature as the hot air temperature during hot air heating. The air flow of the hot air was set to 10 m³/m²/sec. Heating/drying was performed for 15 minutes including the heating time during the recording, i.e., the hot air application time was 15 minutes.

———Degree of Whiteness of White Image———

The degree of whiteness of the white image over the recorded matter was evaluated according to the evaluation criteria below, based on the difference of the degree of whiteness (luminosity: $L_2^*$) of the white image over the recorded matter heated and dried under the conditions presented in Table 17 from a degree of whiteness (luminosity: $L_1^*$) of a white image recorded at room temperature (25° C.) and dried sufficiently at room temperature (25° C.) for 4 days (the difference $\Delta L^* = (L_1^*$ after forming at room temperature and drying at room temperature)$-(L_2^*$ after heating and drying)). The luminosity was measured from the printed portion with a spectroscopic colorimetric densitometer (product name: X-RITE 939 available from X-Rite, Incorporated) in a state that the recorded PET film was backed with a commercially available black sheet of paper.

[Evaluation Criteria]

A: The $\Delta L^*$ value was 70 or greater.
B: The $\Delta L^*$ value was 60 or greater but less than 70.
C: The $\Delta L^*$ value was less than 60.

———Measurement of Water Content and Water-Soluble Organic Solvent Content in Coating Film———

The white ink coating film after the first heating treatment was rubbed off with a spatula, and measured with a thermogravimetric/differential thermal analyzer (product name: THERMO PLUS available from Rigaku Corporation). The weight of the water-soluble organic solvent component was calculated from the obtained thermogravimetric change (TG) data, and expressed as a relative value (%) with respect to the solvent weight in the intact white ink. With the thermogravimetric/differential thermal analyzer, about 15 mg of the white ink was heated under a nitrogen atmosphere at 10 K/min up to 300° C., to thereby obtain the TG data. To calculate the weight of the water-soluble organic solvent component, temperatures Tw (° C.) and To (° C.) at which amounts of reduction equal to the water amount Siw (%) and the total amount Sio (%) of the water-soluble organic solvent were observed were obtained from TG data of the intact white ink, a weight Wsw (mg) at the Tw and a weight Wso (mg) at the To were obtained from the Tg data of the white ink coating film, and the water content and the water-soluble organic solvent content in the white ink coating film were calculated according to the formula below.

Water content=$Wsw \times (100-Siw-Sio)/Wso$

Water-soluble organic solvent content=$(Wsw-Wso) \times (100-Siw-Sio)/Wso$

———Drying Property of White Ink———

A drying property of the white ink was evaluated according to the evaluation criteria below, by scrubbing the white ink coating film surface after the drying with a finger ball and confirming a peeling state.

[Evaluation Criteria]

A: The coating film was not peeled.
B: The coating film was partially peeled, and the white ink transferred to the finger.
C: The coating film was peeled and disappeared.

———Jetting Stability———

After jetting conditions were examined, the head nozzle surfaces were capped for protection and left for 2 weeks.

After the leaving for 2 weeks, jetting conditions during jetting operations were examined, and jetting stability of the white ink was evaluated according to the evaluation criteria below.

[Evaluation Criteria]

A: The white ink was jetted from all nozzles safely.

B: There were nozzles from which the white ink could not be jetted, but these nozzles could be recovered by a maintaining/recovering operation.

C: There were nozzles from which the white ink could not be jetted, and these nozzles could not be recovered by a maintaining/recovering operation.

TABLE 17

|  |  | White ink No. | Temperature (° C.) in first heating treatment | Temperature (° C.) in second heating treatment | Water content (% by mass) in coating film after first heating treatment | Water-soluble organic solvent content (% by mass) in coating film after first heating treatment | Evaluation result | | |
|---|---|---|---|---|---|---|---|---|---|
|  |  |  |  |  |  |  | Degree of whiteness | Drying property | Jetting stability |
| Text examples | 1 | 11 | 40 | 25 | 8 | 24 | B | B | B |
|  | 2 | 11 | 70 | 70 | 5 | 9 | B | A | B |
|  | 3 | 11 | 55 | 70 | 6 | 16 | A | A | B |
|  | 4 | 11 | 40 | 70 | 8 | 24 | A | A | B |
|  | 5 | 11 | 80 | 70 | 3 | 5 | C | A | B |
|  | 6 | 11 | 30 | 70 | 12 | 28 | C | A | B |

As clear from Table 17, Test Examples 1 to 4 were good in the degree of whiteness of the white image after heating/drying. Text Examples 1 to 4 were also good in jetting stability. Meanwhile, Test examples 5 and 6 were poor in the degree of whiteness.

Aspects of the present invention are, for example, as follows.

<1> A white ink including:
   water;
   a water-soluble organic solvent; and
   a colorant including hollow resin particles,
   wherein the water-soluble organic solvent is at least one of a monohydric alcohol having a boiling point of 240° C. or lower and a diol having a boiling point of 240° C. or lower, having at least one hydroxyl group bonded to an alkane chain at a site other than terminals of the alkane chain, and having 4 to 6 carbon atoms, and
   wherein a content of the at least one of the monohydric alcohol and the diol is equal to or greater than 75.0% by mass of a total amount of the water-soluble organic solvent.

<2> The white ink according to <1>,
   wherein the white ink is prepared for being ink-jetted.

<3> The white ink according to <1> to <2>,
   wherein a content of a water-soluble organic solvent having a boiling point higher than 240° C. is equal to or less than 13% by mass of the total amount of the water-soluble organic solvent.

<4> The white ink according to any one of <1> to <3>,
   wherein the diol having at least one hydroxyl group bonded to an alkane chain at a site other than terminals of the alkane chain and having 4 to 6 carbon atoms is at least one selected from 1,2-butanediol, 1,3-butanediol, 2,3-butanediol, 3-methyl-1,3-butanediol, and 2-methyl-2,4-pentanediol.

<5> The white ink according to any one of <1> to <4>,
   wherein a volume average particle diameter of the hollow resin particles is from 0.2 μm to 1 μm.

<6> The white ink according to any one of <1> to <5>,
   wherein a percentage of hollowness of the hollow resin particles is from 20% to 80%.

<7> The white ink according to any one of <1> to <6>,
   wherein the hollow resin particles are a styrene-acrylic resin.

<8> The white ink according to any one of <1> to <7>,
   wherein a content of the hollow resin particles is from 1% by mass to 30% by mass.

<9> The white ink according to any one of <1> to <8>,
   further including
   a film forming resin.

<10> The white ink according to any one of <1> to <9>,
   wherein a volume average particle diameter of the film forming resin is from 10 nm to 1,000 nm.

<11> The white ink according to any one of <1> to <10>,
   wherein the film forming resin is a polyurethane resin.

<12> The white ink according to any one of <1> to <11>,
   wherein a content of the film forming resin is from 1% by mass to 10% by mass.

<13> The white ink according to any one of <1> to <12>,
   wherein the white ink is prepared for being heated and dried.

<14> An ink set including:
   a white ink including water, a water-soluble organic solvent, and a colorant including hollow resin particles; and
   an ink including water and a water-soluble organic solvent and free of hollow resin particles,
   wherein the water-soluble organic solvent in the white ink includes a diol having a boiling point of 240° C. or lower, having at least one hydroxyl group bonded to an alkane chain at a site other than terminals of the alkane chain, and having 4 to 6 carbon atoms,
   wherein a content of the diol in the white ink is equal to or greater than 80% by mass of a total amount of the water-soluble organic solvent in the white ink,
   wherein the water-soluble organic solvent in the ink free of hollow resin particles includes a diol having a boiling point of 240° C. or lower, having at least one hydroxyl group bonded to an alkane chain at a site other than terminals of the alkane chain, and having 4 to 6 carbon atoms, and
   wherein a content of the diol in the ink free of hollow resin particles is equal to or greater than 80% by mass of a total amount of the water-soluble organic solvent in the ink free of hollow resin particles.

<15> An ink cartridge including:
   a container; and
   the white ink according to any one of <1> to <13> stored in the container.

<16> An inkjet recording apparatus including:
   an ink delivering unit configured to fly the white ink according to any one of <1> to <13> prepared for being ink-jetted and record an image over a recording medium, and a heating unit configured to heat and dry the recording medium over which the image is recorded.

<17> The inkjet recording apparatus according to <16>,
wherein the heating unit includes, in an order of reciting, a first heating member configured to heat the recording medium at 40° C. to 70° C. and a second heating member configured to apply hot air to the recording medium.

<18> The inkjet recording apparatus according to <17>,
wherein a temperature of the hot air of the second heating member is higher than a heating temperature of the first heating member.

<19> The inkjet recording apparatus according to <17> or <18>,
wherein a heating temperature of the first heating member is lower than a glass transition temperature of the hollow resin particles by 30° C. or more.

<20> The inkjet recording apparatus according to any one of <17> to <19>,
wherein a content of the water-soluble organic solvent in the white ink having gone through the first heating member is 20% by mass or less.

<21> An inkjet recording method including:
an ink delivering step of flying the white ink according to any one of <1> to <13> prepared for being ink-jetted and recording an image over a recording medium; and
a heating step of heating and drying the recording medium over which the image is recorded.

<22> The inkjet recording method according to <21>,
wherein the heating step includes, in an order of reciting, a first heating treatment in which the recording medium is heated at 40° C. to 70° C. and a second heating treatment in which hot air is applied to the recording medium.

<23> The inkjet recording method according to <22>,
wherein a temperature of the hot air in the second heating treatment is higher than a heating temperature in the first heating treatment.

<24> The inkjet recording method according to <22> or <23>,
wherein a heating temperature in the first heating treatment is lower than a glass transition temperature of the hollow resin particles by 30° C. or more.

<25> The inkjet recording method according to any one of <22> to <24>,
wherein a content of the water-soluble organic solvent in the white ink having gone through the first heating treatment is 20% by mass or less.

<26> A recording method for recording an image over a recording medium with the ink set according to <14>, the recording method including, in an order of reciting:
a first applying step of applying the white ink over a recording medium; and
a second applying step of applying the ink free of hollow resin particles over a coating film of the white ink.

<27> The recording method according to <26>,
wherein an amount of the white ink applied over the recording medium is greater than an amount of the ink free of hollow resin particles applied over the recording medium.

<28> The recording method according to <26> or <27>, including between the first applying step and the second applying step:
a heating step of heating the recording medium onto which the white ink is delivered,
wherein a heating temperature in the heating step is lower than a glass transition temperature of the hollow resin particles in the white ink by 30° C. or more.

The white ink according to any one of <1> to <13>, the ink set according to <14>, the inkjet recording apparatus according to any one of <16> to <20>, the inkjet recording method according to any one of <21> to <25>, and the recording method according to any one of <26> to <28> are intended to solve the various conventional problems described above and achieve the object described below. That is, an object of the white ink, the ink set, the inkjet recording apparatus, the inkjet recording method, and the recording method is to provide a white ink, an ink set, an inkjet recording apparatus, an inkjet recording method, and a recording method that are capable of suppressing reduction in a degree of whiteness of a white image formed over a recording medium even when the white image is heated and dried immediately after formed.

The ink cartridge according to <15> is intended to solve the various conventional problems described above and achieve the object described below. That is, an object of the ink cartridge is to provide an ink cartridge capable of storing a white ink that is capable of suppressing reduction in a degree of whiteness of a white image formed over a recording medium even when the white image is heated and dried immediately after formed.

This application claims priority to Japanese application No. 2014-241982 filed on Nov. 28, 2014 and incorporated herein by reference, and Japanese application No. 2015-101222 filed on May 18, 2015 and incorporated herein by reference.

What is claimed is:

1. A white ink comprising:
   water;
   a water-soluble organic solvent; and
   a colorant that comprises hollow resin particles,
   wherein the water-soluble organic solvent comprises at least one of a monohydric alcohol having a boiling point of 240° C. or lower and a diol having a boiling point of 240° C. or lower, having at least one hydroxyl group bonded to an alkane chain at a site other than terminals of the alkane chain, and having 4 to 6 carbon atoms, and
   wherein a content of the at least one of the monohydric alcohol and the diol is equal to or greater than 75.0% by mass of a total amount of the water-soluble organic solvent.

2. The white ink according to claim 1,
wherein a content of a water-soluble organic solvent having a boiling point higher than 240° C. is equal to or less than 13% by mass of the total amount of the water-soluble organic solvent.

3. The white ink according to claim 1,
wherein the diol having at least one hydroxyl group bonded to an alkane chain at a site other than terminals of the alkane chain and having 4 to 6 carbon atoms comprises at least one selected from 1,2-butanediol, 1,3-butanediol, 2,3-butanediol, 3-methyl-1,3-butanediol, and 2-methyl-2,4-pentanediol.

4. The white ink according to claim 1,
wherein a volume average particle diameter of the hollow resin particles is from 0.2 µm to 1 µm.

5. The white ink according to claim 1,
wherein a percentage of hollowness of the hollow resin particles is from 20% to 80%.

6. The white ink according to claim 1,
wherein the hollow resin particles comprise a styrene-acrylic resin.

7. The white ink according to claim 1,
wherein a content of the hollow resin particles is from 1% by mass to 30% by mass.

8. An ink cartridge comprising:
a container; and
the white ink according to claim 1 stored in the container.

9. An inkjet recording apparatus comprising:
an ink delivering unit configured to fly the white ink according to claim 1 and deliver the white ink onto a recording medium; and
a heating unit configured to heat and dry the recording medium onto which the white ink is delivered.

10. The inkjet recording apparatus according to claim 9, wherein the heating unit comprises, in an order of reciting, a first heating member configured to heat the recording medium at 40° C. to 70° C. and a second heating member configured to apply hot air to the recording medium.

11. The inkjet recording apparatus according to claim 9, wherein the heating unit comprises, in an order of reciting, a first heating member configured to heat the recording medium at 40° C. to 70° C. and a second heating member configured to apply hot air to the recording medium, and
wherein a temperature of the hot air of the second heating member is higher than a heating temperature of the first heating member.

12. The inkjet recording apparatus according to claim 9, wherein the heating unit comprises, in an order of reciting, a first heating member configured to heat the recording medium at 40° C. to 70° C. and a second heating member configured to apply hot air to the recording medium, and
wherein a heating temperature of the first heating member is lower than a glass transition temperature of the hollow resin particles by 30° C. or more.

13. An ink set comprising:
a white ink that comprises water, a water-soluble organic solvent, and a colorant that comprises hollow resin particles; and
an ink that comprises water and a water-soluble organic solvent and is free of hollow resin particles,
wherein the water-soluble organic solvent in the white ink comprises a diol having a boiling point of 240° C. or lower, having at least one hydroxyl group bonded to an alkane chain at a site other than terminals of the alkane chain, and having 4 to 6 carbon atoms,
wherein a content of the diol in the white ink is equal to or greater than 80% by mass of a total amount of the water-soluble organic solvent in the white ink,
wherein the water-soluble organic solvent in the ink free of hollow resin particles comprises a diol having a boiling point of 240° C. or lower, having at least one hydroxyl group bonded to an alkane chain at a site other than terminals of the alkane chain, and having 4 to 6 carbon atoms, and
wherein a content of the diol in the ink free of hollow resin particles is equal to or greater than 80% by mass of a total amount of the water-soluble organic solvent in the ink free of hollow resin particles.

14. A recording method for recording an image over a recording medium with the ink set according to claim 13, the recording method comprising, in an order of reciting:
first applying of the white ink over a recording medium; and
second applying of the ink free of hollow resin particles over a coating film of the white ink.

15. A recording method for recording an image over a recording medium with the ink set according to claim 13, the recording method comprising, in an order of reciting:
first applying of the white ink over a recording medium; and
second applying of the ink free of hollow resin particles over a coating film of the white ink,
wherein an amount of the white ink applied over the recording medium is greater than an amount of the ink free of hollow resin particles applied over the recording medium.

16. A recording method for recording an image over a recording medium with the ink set according to claim 13, the recording method comprising, in an order of reciting:
first applying of the white ink over a recording medium; and
second applying of the ink free of hollow resin particles over a coating film of the white ink,
wherein the recording method comprises between the first applying and the second applying, heating the recording medium onto which the white ink is delivered, and
wherein a heating temperature in the heating is lower than a glass transition temperature of the hollow resin particles in the white ink by 30° C. or more.

17. An inkjet recording method comprising:
flying a white ink prepared for being ink-jetted and recording an image over a recording medium; and
heating and drying the recording medium over which the image is recorded,
wherein the white ink comprises water, a water-soluble organic solvent, and a colorant that comprises hollow resin particles, wherein the water-soluble organic solvent comprises at least one of a monohydric alcohol having a boiling point of 240° C. or lower and a diol having a boiling point of 240° C. or lower, having at least one hydroxyl group bonded to an alkane chain at a site other than terminals of the alkane chain, and having 4 to 6 carbon atoms, and
wherein a content of the at least one of the monohydric alcohol and the diol is equal to or greater than 75.0% by mass of a total amount of the water-soluble organic solvent.

18. The inkjet recording method according to claim 17, wherein the heating and drying comprises, in an order of reciting, a first heating treatment in which the recording medium is heated at 40° C. to 70° C. and a second heating treatment in which hot air is applied to the recording medium.

19. The inkjet recording method according to claim 17, wherein the heating and drying comprises, in an order of reciting, a first heating treatment in which the recording medium is heated at 40° C. to 70° C. and a second heating treatment in which hot air is applied to the recording medium, and
wherein a temperature of the hot air in the second heating treatment is higher than a heating temperature in the first heating treatment.

20. The inkjet recording method according to claim 17, wherein the heating and drying comprises, in an order of reciting, a first heating treatment in which the recording medium is heated at 40° C. to 70° C. and a second heating treatment in which hot air is applied to the recording medium, and wherein a content of the water-soluble organic solvent in the white ink after the first heating treatment is 20% by mass or less.

\* \* \* \* \*